United States Patent
Vetter et al.

(10) Patent No.: US 9,819,593 B1
(45) Date of Patent: Nov. 14, 2017

(54) SYSTEM, METHOD AND COMPUTER PROGRAM PRODUCT PROVIDING BYPASS MECHANISMS FOR A VIRTUAL MOBILE DEVICE PLATFORM

(71) Applicant: Hypori, Inc., Austin, TX (US)

(72) Inventors: Brian J. Vetter, Austin, TX (US); Rajesh P. Gopi, West Lake Hills, TX (US); Robert D. Lee, Austin, TX (US); Justin P. Marston, Austin, TX (US)

(73) Assignee: Hypori, Inc., Austin, TX (US)

( * ) Notice: Subject to any disclaimer, the term of this patent is extended or adjusted under 35 U.S.C. 154(b) by 306 days.

(21) Appl. No.: 14/160,946

(22) Filed: Jan. 22, 2014

Related U.S. Application Data

(60) Provisional application No. 61/755,205, filed on Jan. 22, 2013.

(51) Int. Cl.
*H04L 12/803* (2013.01)
*H04L 29/08* (2006.01)

(52) U.S. Cl.
CPC ........ *H04L 47/122* (2013.01); *H04L 67/2861* (2013.01)

(58) Field of Classification Search
CPC ......... H04L 47/70; H04L 47/72; H04L 47/74; H04L 47/78; H04L 47/80; H04L 47/122; H04L 67/2861
See application file for complete search history.

(56) References Cited

U.S. PATENT DOCUMENTS

| | | |
|---|---|---|
| 6,845,238 B1 | 1/2005 | Muller |
| 7,190,356 B2 | 3/2007 | Lin |
| 7,400,328 B1 | 7/2008 | Ye et al. |
| 7,768,959 B1 | 8/2010 | Chen |
| 7,809,667 B1 | 10/2010 | Yehuda et al. |
| 7,827,228 B2 | 11/2010 | Emberton |
| 8,699,379 B2 | 4/2014 | Kholaif et al. |
| 9,060,239 B1 | 6/2015 | Sinha et al. |
| 9,143,886 B1 | 9/2015 | Abou-El-Ella |

(Continued)

OTHER PUBLICATIONS

Office Action for U.S. Appl. No. 14/160,794, dated Sep. 1, 2015, 12 pgs.

(Continued)

*Primary Examiner* — Jackie Zuniga Abad
(74) *Attorney, Agent, or Firm* — Sprinkle IP Law Group

(57) ABSTRACT

Embodiments disclosed herein can allow a user of mobile device in a network environment to switch between using public network services and using private network services. To access private network services, a virtualization cloud client application running on mobile device connects to a virtualized device hosted in virtualization cloud and brokers access to private network services as well as local device functions. Embodiments disclosed herein provide a system, method, and computer program product for improving network latency by bypassing elements or functions on a remote virtual machine. Examples of this approach include moving elements of the user interface from the remote virtual machine to the local physical device, bypassing a media player on a virtual machine, and bypassing certain telephone functions on a virtual machine and instead performing those functions on the physical device.

21 Claims, 12 Drawing Sheets

(56) References Cited

U.S. PATENT DOCUMENTS

| | | | |
|---|---|---|---|
| 9,179,007 B1 | 11/2015 | Yadav | |
| 9,245,241 B2 | 1/2016 | Kite | |
| 9,380,456 B1 | 6/2016 | Lee et al. | |
| 9,380,523 B1 | 6/2016 | Mijar et al. | |
| 9,380,562 B1 | 6/2016 | Vetter et al. | |
| 9,619,673 B1 | 4/2017 | Vetter | |
| 9,622,068 B2 | 4/2017 | Mijar et al. | |
| 9,667,703 B1 | 5/2017 | Vetter et al. | |
| 9,674,171 B2 | 6/2017 | Vetter et al. | |
| 9,697,629 B1 | 7/2017 | Vetter et al. | |
| 2003/0182383 A1 | 9/2003 | He | |
| 2005/0088992 A1 | 4/2005 | Bolin | |
| 2006/0203916 A1 | 9/2006 | Chandramouly et al. | |
| 2006/0288306 A1 | 12/2006 | Mahajan et al. | |
| 2007/0086382 A1 | 4/2007 | Narayanan | |
| 2007/0117561 A1 | 5/2007 | Shu | |
| 2008/0225010 A1 | 9/2008 | Wang | |
| 2009/0023426 A1 | 1/2009 | Shatzkamer | |
| 2009/0077475 A1 | 3/2009 | Koster | |
| 2009/0131080 A1 | 5/2009 | Nadler | |
| 2009/0170472 A1 | 7/2009 | Chapin | |
| 2009/0207140 A1 | 8/2009 | Hansson | |
| 2009/0264094 A1 | 10/2009 | Smith | |
| 2009/0296689 A1 | 12/2009 | Bakker et al. | |
| 2010/0069035 A1 | 3/2010 | Johnson | |
| 2010/0100725 A1 | 4/2010 | Ozzie | |
| 2010/0103837 A1* | 4/2010 | Jungck | H04L 29/12066 370/252 |
| 2010/0115020 A1 | 5/2010 | Hochmuth et al. | |
| 2010/0167714 A1 | 7/2010 | Howarter | |
| 2010/0173605 A1 | 7/2010 | Moraes | |
| 2010/0189887 A1 | 7/2010 | Nielsen | |
| 2010/0238837 A1 | 9/2010 | Zheng | |
| 2010/0306249 A1 | 12/2010 | Hill | |
| 2010/0306771 A1 | 12/2010 | Kamay et al. | |
| 2011/0102299 A1 | 5/2011 | Hochmuth et al. | |
| 2011/0130951 A1 | 6/2011 | Lee | |
| 2011/0176528 A1 | 7/2011 | Lu | |
| 2011/0210972 A1 | 9/2011 | Tsirkin et al. | |
| 2011/0213828 A1 | 9/2011 | Tsirkin et al. | |
| 2011/0223918 A1 | 9/2011 | Dahlen | |
| 2011/0270600 A1 | 11/2011 | Bose | |
| 2011/0271200 A1 | 11/2011 | Kikkawa et al. | |
| 2012/0030022 A1 | 2/2012 | Ajima et al. | |
| 2012/0064908 A1 | 3/2012 | Fox et al. | |
| 2012/0066304 A1 | 3/2012 | Marmon et al. | |
| 2012/0093145 A1 | 4/2012 | Anchan et al. | |
| 2012/0130042 A1 | 5/2012 | Brunelle et al. | |
| 2012/0182970 A1 | 7/2012 | Ding | |
| 2012/0191657 A1 | 7/2012 | Weinstein et al. | |
| 2012/0296963 A1 | 11/2012 | Lu | |
| 2012/0310894 A1 | 12/2012 | Freedman et al. | |
| 2012/0323690 A1 | 12/2012 | Michael | |
| 2013/0024778 A1 | 1/2013 | Reeves et al. | |
| 2013/0031482 A1 | 1/2013 | Saul | |
| 2013/0078994 A1 | 3/2013 | Jouin | |
| 2013/0083960 A1 | 4/2013 | Kostrzewski et al. | |
| 2013/0086202 A1 | 4/2013 | Connelly | |
| 2013/0173556 A1 | 7/2013 | Grigg et al. | |
| 2013/0188608 A1 | 7/2013 | Balachandran | |
| 2013/0265450 A1 | 10/2013 | Barnes, Jr. | |
| 2013/0275766 A1 | 10/2013 | Plainecassagne et al. | |
| 2013/0283038 A1 | 10/2013 | Kulkarni et al. | |
| 2013/0326072 A1 | 12/2013 | Smyth | |
| 2013/0339185 A1 | 12/2013 | Johnson | |
| 2013/0339498 A1 | 12/2013 | Johnson | |
| 2014/0059160 A1 | 2/2014 | Chernoff | |
| 2014/0071895 A1 | 3/2014 | Bane et al. | |
| 2014/0108084 A1 | 4/2014 | Bargetzi | |
| 2014/0108940 A1 | 4/2014 | Diercks | |
| 2014/0111528 A1* | 4/2014 | Lifshitz | G06T 1/20 345/522 |
| 2014/0358670 A1 | 12/2014 | Lefevre | |
| 2015/0050915 A1 | 2/2015 | Formo | |
| 2015/0082456 A1 | 3/2015 | Eren et al. | |
| 2015/0089395 A1 | 3/2015 | Beel et al. | |
| 2015/0091947 A1 | 4/2015 | Rakow et al. | |
| 2015/0222604 A1 | 8/2015 | Ylonen | |
| 2016/0295394 A1 | 10/2016 | Mijar et al. | |
| 2016/0295551 A1 | 10/2016 | Vetter et al. | |
| 2017/0177420 A1 | 6/2017 | Vetter et al. | |

OTHER PUBLICATIONS

Office Action for U.S. Appl. No. 14/062,343, dated May 26, 2015, 16 pgs.

Office Action for U.S. Appl. No. 14/161,083, dated Feb. 3, 2016, 27 pgs.

Office Action for U.S. Appl. No. 14/161,157, dated Feb. 22, 2016, 15 pgs.

Office Action for U.S. Appl. No. 14/161,083, dated Jul. 8, 2016, 31 pgs.

Office Action for U.S. Appl. No. 14/160,794, dated Mar. 9, 2016, 11 pgs.

Office Action for U.S. Appl. No. 14/161,157, dated Aug. 17, 2016, 20 pgs.

Office Action for U.S. Appl. No. 14/160,794, dated Aug. 22, 2016, 6 pgs.

Office Action for U.S. Appl. No. 15/181,783, dated Aug. 22, 2016, 10 pgs.

Notice of Allowance for U.S. Appl. No. 15/181,783, dated Dec. 2, 2016, 5 pgs.

Notice of Allowance for U.S. Appl. No. 14/161,083, dated Dec. 5, 2016, 6 pgs.

Notice of Allowance for U.S. Appl. No. 15/181,570, dated Apr. 20, 2017, 6 pgs.

Notice of Allowance for U.S. Appl. No. 14/161,083, dated Apr. 21, 2017, 6 pgs.

Office Action for U.S. Appl. No. 15/181,570, dated Feb. 1, 2017, 6 pgs.

Notice of Allowance for U.S. Appl. No. 14/161 157, dated Feb. 3, 2017, 4 pgs.

Notice of Allowance for U.S. Appl. No. 14/160,794, dated Feb. 17, 2017, 4 pgs.

* cited by examiner

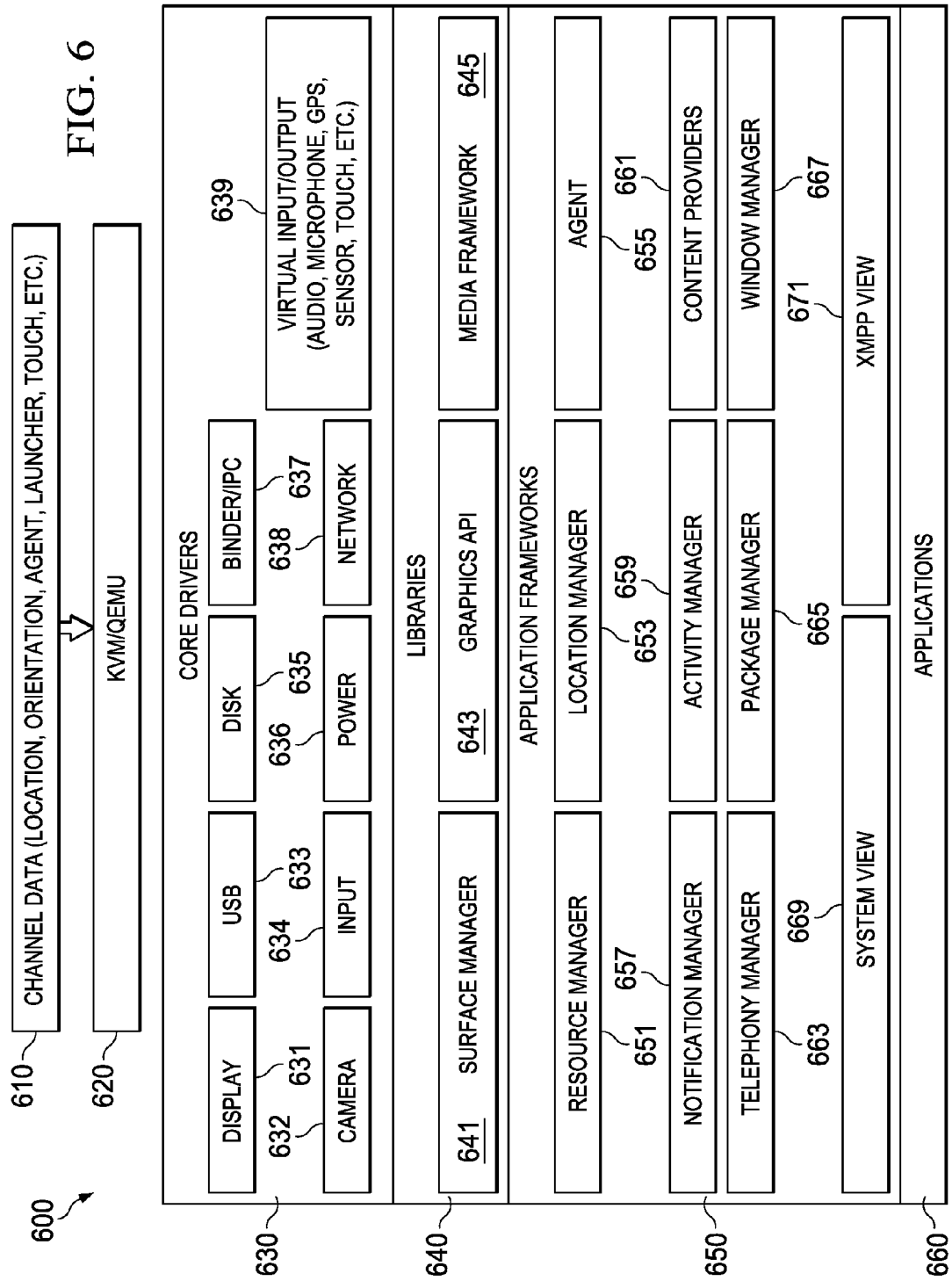

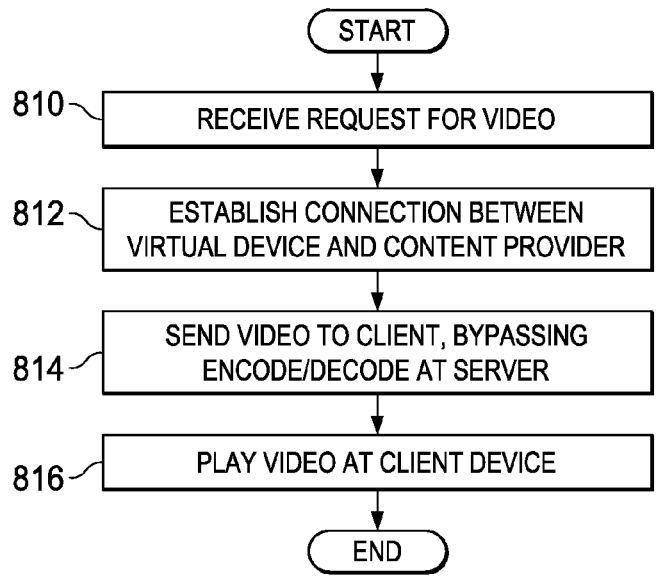
FIG. 8
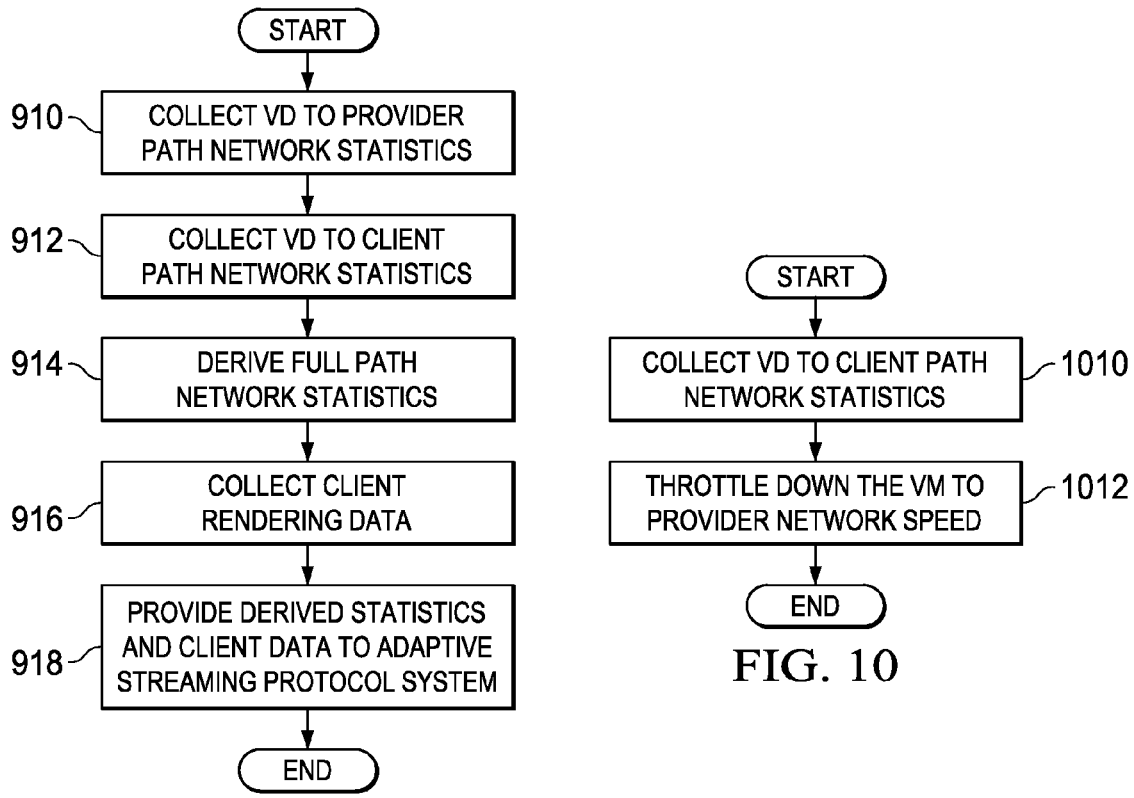
FIG. 9
FIG. 10

SYSTEM, METHOD AND COMPUTER PROGRAM PRODUCT PROVIDING BYPASS MECHANISMS FOR A VIRTUAL MOBILE DEVICE PLATFORM

CROSS-REFERENCE TO RELATED APPLICATION(S)

This application is a conversion of and claims a benefit of priority from U.S. Provisional Application No. 61/755,205, filed Jan. 22, 2013, entitled "VIRTUAL MOBILE DEVICE PLATFORM." This application relates to U.S. patent application Ser. No. 14/160,794, filed Jan. 22, 2014, entitled "SYSTEM, METHOD AND COMPUTER PROGRAM PRODUCT FOR CAPTURING TOUCH EVENTS FOR A VIRTUAL MOBILE DEVICE PLATFORM"; Ser. No. 14/160,877, filed Jan. 22, 2014, entitled "SYSTEM, METHOD AND COMPUTER PROGRAM PRODUCT FOR PROVIDING NOTIFICATIONS FROM A VIRTUAL DEVICE TO A DISCONNECTED PHYSICAL DEVICE"; Ser. No. 14/160,904, filed Jan. 22, 2014, entitled "SYSTEM, METHOD AND COMPUTER PROGRAM PRODUCT FOR CONNECTING ROAMING MOBILE DEVICES TO A VIRTUAL DEVICE PLATFORM"; Ser. No. 14/161,069, filed Jan. 22, 2014, entitled "SYSTEM, METHOD AND COMPUTER PROGRAM PRODUCT FOR DYNAMICALLY SWITCHING OPERATING SYSTEMS IN A VIRTUAL MOBILE DEVICE PLATFORM"; Ser. No. 14/161,083, filed Jan. 22, 2014, entitled "SYSTEM, METHOD AND COMPUTER PROGRAM PRODUCT FOR USER PERFORMANCE AND DEVICE RESOLUTION SETTINGS"; and Ser. No. 14/161,157, filed Jan. 22, 2014, entitled "SYSTEM, METHOD AND COMPUTER PROGRAM PRODUCT FOR GENERATING REMOTE VIEWS IN A VIRTUAL MOBILE DEVICE PLATFORM." All applications listed in this paragraph are incorporated by reference as if set forth herein in their entireties.

TECHNICAL FIELD

This disclosure relates generally to a virtual mobile device platform for touch-enabled mobile devices. More particularly, embodiments disclosed herein relate to a system, method, and computer program product for providing bypass mechanisms for a virtual mobile device platform.

BACKGROUND OF THE RELATED ART

Today's mobile devices such as smart phones and tablets face unique security issues, some of which go hand in hand with mobility. Enterprises, military, and intelligence agencies (collectively referred to herein as "organizations") are all grappling with their users' use of mobile devices as many users are carrying out both business as well as personal activities on their mobile devices. This can be problematic even if a Bring Your Own Device ("BYOD") device policy is in place.

BYOD can raise serious security issues when a user's personal device is used to access both non-sensitive and sensitive (and sometimes risky) networks and/or services. For example, if an employee uses his personal smartphone to access a company network and then loses that phone, untrusted parties could retrieve any unsecured data on the phone. Another type of security breach occurs when an employee leaves a company, she does not have to give the company back her personal device, so company-owned applications and other data may still be present on her personal device. A challenging but important task for organizations that utilize BYOD is to develop a policy that defines exactly what sensitive company information needs to be protected and which employees should have access to this information, and then to educate all employees on this policy. Commercial carriers are normally relied upon for implementing the security requirements of an organization's BYOD policy.

Because of Internet-based risks, some very risk-averse organizations issue devices specifically for Internet use (this is termed "Inverse-BYOD"), providing unfiltered access to the Internet and reserving filtered, sensitive network data for use within a secured, private network. However, this means that a user likely has to carry multiple devices (including one for his personal use) and organizations do not have a sure way of preventing the user from using his personal mobile device to communicate non-sensitive but company-related information. As such, organizations continue to search for solutions that allow mobile services to be delivered or shared within a single device, rather than having to issue their users multiple devices or separate devices for their personal use and locking them into private networks.

Finding viable solutions to handle mobile devices can be particularly challenging for organizations that operate in high assurance computing environments. A high assurance computing environment is one that provides a certain level of assurance as to its behavior, useful in ensuring a level of secrecy for classified information. For instance, a high assurance operating system may permit only certain certified applications to access a particular portion of a memory on a device where sensitive information is stored. However, this does not prevent the physical device itself to become suspect—how it was built, who has handled it from manufacturing through use, how it is used by the user, etc. Moreover, the device could be physically accessed or otherwise compromised in many ways. For instance, information stored or cached on a mobile device could be accessed while its owner is away (e.g., left on the table at a restaurant or on their desk at work, stolen, or lost) or the user may have downloaded an infected application or could be sent an infected document via email or instant messaging, or accessed an infected service.

Because a mobile device lives in a hostile world, securing the physical device itself (e.g., via Tempest hardware, encrypted storage, biometrics, etc.) is not enough and can be very expensive to do a thorough job. Even so, infiltration from any portion of the stack—from the chips to the software that is installed to the data the device receives—still leaves the device vulnerable to attacks from well-funded, motivated, adversaries. Attempts to provide the level of separation needed within the actual device face many challenges, and at best are likely to become a very expensive niche proposition in the overall commercial mobility ecosystem.

In view of unique challenges in incorporating mobile devices such as smart phones and tablets into secure computing environments, there is room for innovations and improvements.

SUMMARY OF THE DISCLOSURE

Embodiments disclosed herein provide a system, method, and computer program product for reducing network latency in a virtual mobile device platform, including identifying an element of the virtual mobile device that tends to cause network latency, and bypassing the identified element of the virtual mobile device when communicating with the physical mobile device.

In some embodiments, when using a virtual device to access multimedia streams, decoding and encoding steps in the virtual device are bypassed. In some embodiments, user interface elements are moved from a virtual device to a physical device to improve performance.

Embodiments disclosed herein can provide many advantages. For example, in some embodiments, network latency can be improved by bypassing one or more elements or functions in a virtual device.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 6 depicts a diagrammatic representation of an example of virtualization server software architecture according to one embodiment.

FIG. 8 depicts a flowchart of a multimedia bypass process, according to one embodiment.

FIG. 9 depicts a flowchart of a process for multimedia bypassing, according to one embodiment, where adaptive streaming is used by a content provider.

FIG. 10 depicts a flowchart of a process for multimedia bypassing, according to one embodiment, where proprietary adaptive streaming is used by a content provider.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As described above, a mobile device lives in a hostile world and, as such, securing the device itself may not be enough and/or possible. There is a desire to separate a physical device from applications that run on the device. Embodiments disclosed herein can remove the applications and services, even much of the device's operating environment from the hostile environment. Instead, these functions are provided on protected hardware and software in a data center where they can be managed, monitored, repaired, and deployed under the care of information technology (IT) experts and administrators.

Figure 1:
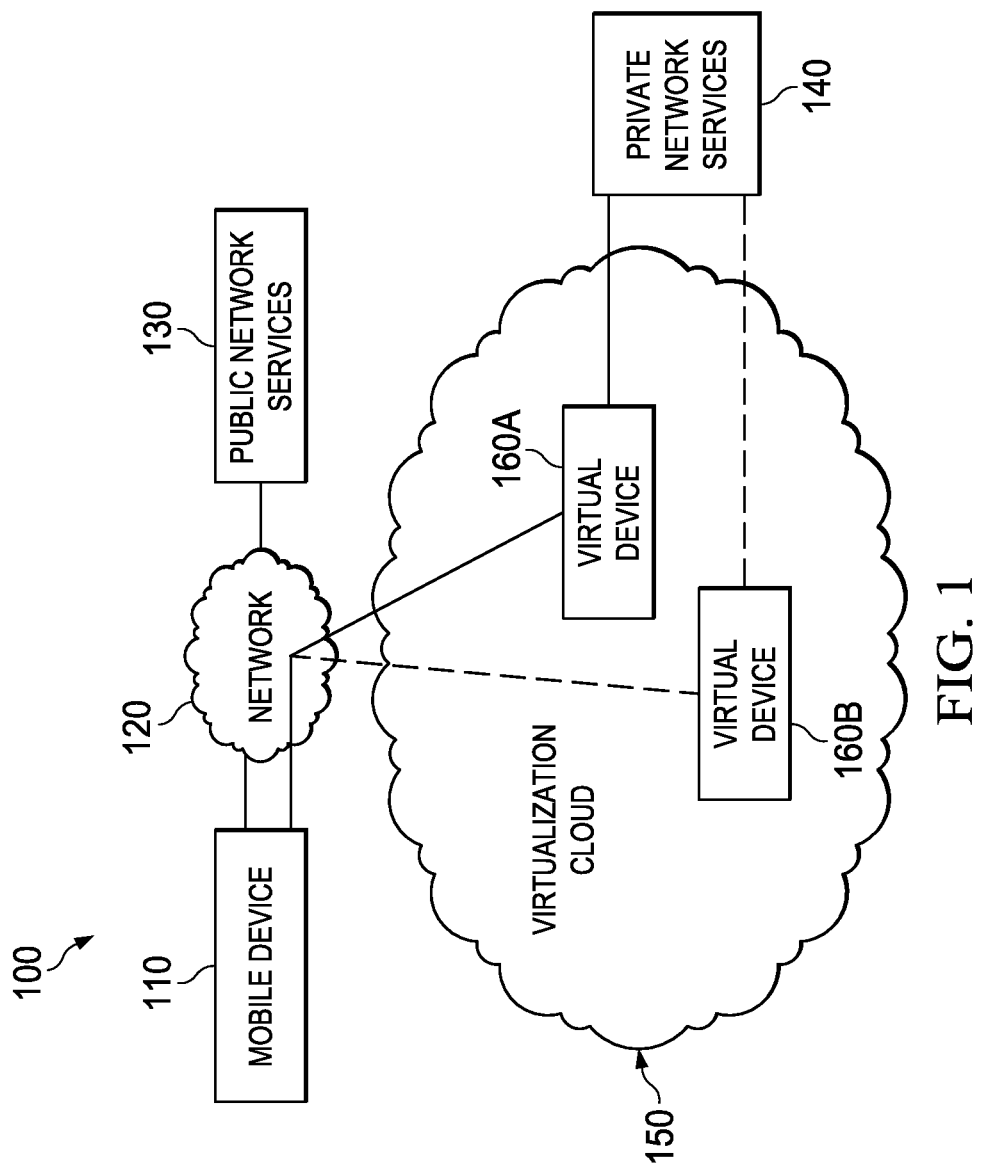
FIG. 1 depicts a diagrammatic representation of an example of an overall network environment in which embodiments disclosed herein may be implemented.

As illustrated in FIG. 1, embodiments disclosed herein can allow a user of mobile device 110 in network environment 100 to switch between using public network services 130 and using private network services 140. In particular, the user may access public network services 130 via public network 120 such as the Internet over which non-sensitive information may be communicated. However, to access private network services 140, a virtualization cloud client application (referred to hereinafter as a "VC client application") running on mobile device 110 connects to a virtualized device (e.g., virtual device 160A) hosted in virtualization cloud 150 and brokers access to private network services 140 as well as local device functions.

Those skilled in the art will appreciate that local device functions may vary depending upon the type of mobile device 110. For example, mobile device 110 can be a touchscreen smartphone with local device functions such as the touch screen, the dialer/phone network, camera, Global Positioning System (GPS), keyboard, speakers, microphone, and so on. Other examples of mobile device 110 may include touchscreen tablets and other touch-enabled mobile devices. As will be explained in further detail below, such mobile device functions can be provided by embodiments disclosed herein on protected hardware and software in virtualization cloud 150 without adversely affecting the user's experience in interacting with mobile device 110, even if the user travels frequently from one continent to another.

In some embodiments, multiple virtualized devices may be created for the same physical device. For example, in FIG. 1, virtual device 160A and virtual device 160B may be created for mobile device 110. This feature is further described below with reference to FIG. 2.

Figure 2:
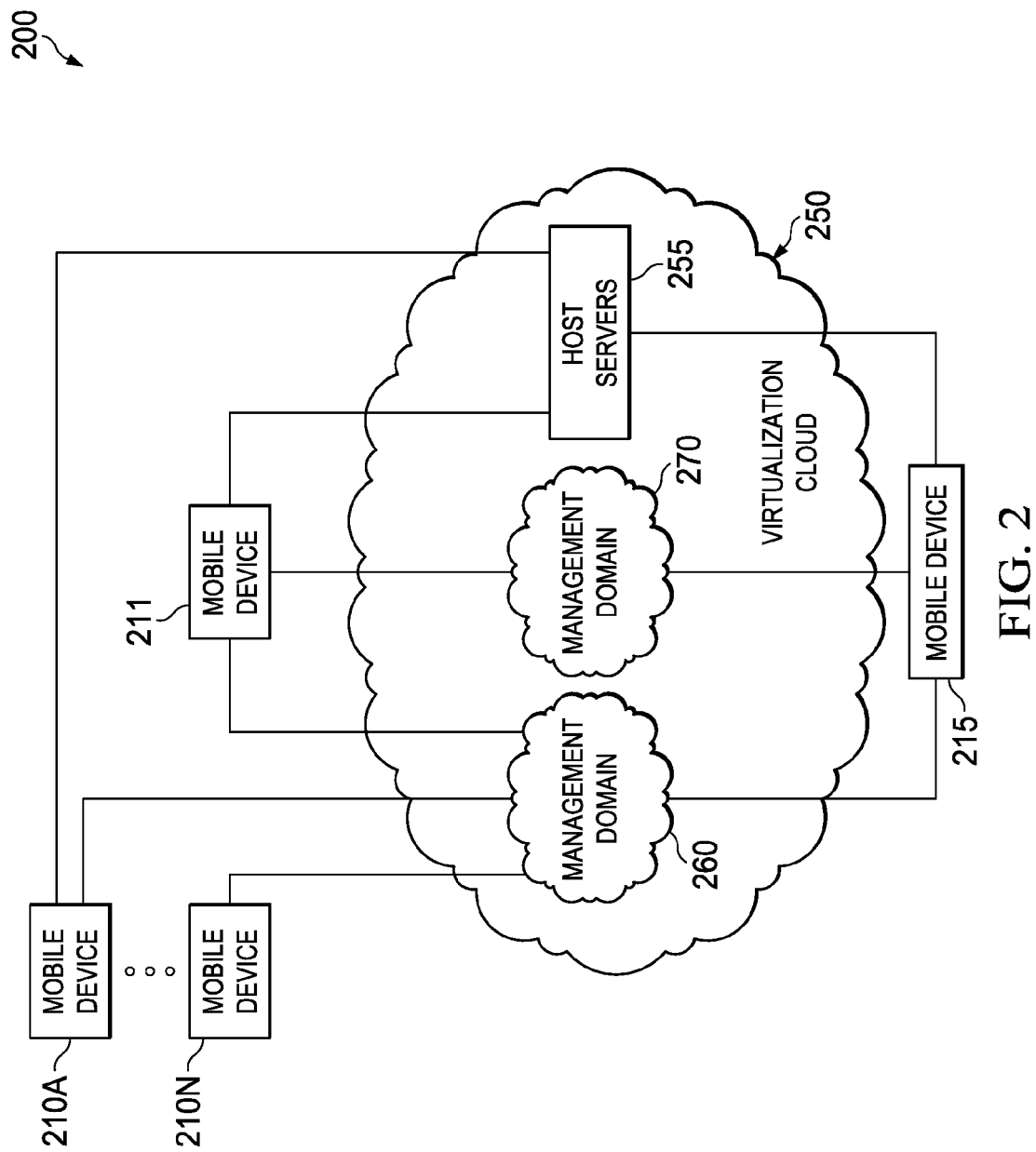
FIG. 2 depicts a diagrammatic representation of an example of a network architecture according to one embodiment.

FIG. 2 depicts a diagrammatic representation of an example of a network architecture according to one embodiment. In this example, system 200 may include virtualization cloud 250 communicatively connected to various types of mobile devices 210A . . . 210N, 211, and 215. Mobile devices 210A . . . 210N, 211, and 215 may represent different types of actual touchscreen devices such as smartphones and tablets. Mobile devices 210A . . . 210N, 211, and 215 may be owned by the same or different entities (e.g., enterprises, users, etc.). Further, mobile devices 210A . . . 210N, 211, and 215 may be programmed with different operating systems such as iOS, Android, and Windows.

Each of mobile devices 210A . . . 210N, 211, and 215 may have a VC client application installed, for instance, by an administrator or IT personnel of system 200. In one embodiment, a VC client application may be downloaded from an online device-specific app store.

In one embodiment, a VC client application may comprise software that brokers access to mobile devices' physical interfaces (e.g., soft and hard keyboards, touchscreen, GPS, camera, accelerometer, speakers, microphone, phone dialer, etc.) and Virtual Private Network (VPN) software that connects across a public network such as the Internet to servers in a virtualization cloud (e.g., virtualization cloud 150 of FIG. 1) over encrypted network interfaces. Virtualization cloud 250 may be an embodiment of virtualization cloud 150 described above with reference to FIG. 1.

Virtualization cloud 250 provides a hosted, networked, application environment. As a non-limiting example, in one embodiment, virtualization cloud 250 is configured as an Android application environment. As illustrated in FIG. 2, virtualization cloud 250 may comprise host servers 255 and management domains 260, 270.

Host servers 255 may host application services. Private network services 140 of FIG. 1 may be an embodiment of application services hosted by host servers 255 of FIG. 2. In one embodiment, a plurality of application services may execute on a collection of servers with extensions to support separation and segmentation of a core server.

Each management domain may comprise a collection of virtualized devices, hosted on one or more server machines. In an Android application environment, such virtualized devices may be referred to as virtual Android devices. From another perspective, a management domain is made up of a collection of server machines providing services to a large number of users. A collection of server machines may host virtual devices for these users and provide access to the applications and services via a remote client interface. In some embodiments, a management domain may further comprise a private application "store" for hosting installable approved enterprise applications particular to that management domain. In some embodiments, a user can have access to one or more "virtual devices" hosted in the management domain, each virtual device containing a core set of applications such as an enterprise address book, mail, calendar, web browser, etc. in addition to any preinstalled enterprise applications.

As FIG. 2 exemplifies, each mobile device (e.g., mobile device 210A, mobile device 211, mobile device 215, etc.) has a connection (via a VC client application installed thereon) to one or more server machines that host their virtual device(s) in a virtualization cloud (e.g., virtualization cloud 250). As explained below, the applications and their data located within a single virtual device are completely inaccessible to the applications and data in another virtual device. The applications are limited to the network services within their management domain and thus cannot access the network services provided in other management domains. For example, mobile device 210A may have a first virtual device hosted on a first server machine in management domain 260 and a second virtual device hosted on a second server machine in management domain 270. However, the applications and their data located within the first virtual device in management domain 260 are completely inaccessible to the applications and data within the second virtual device in management domain 270.

In some embodiments, for each connection to an application service hosted in the virtualization cloud, a different instance of the VC client application is started on the mobile device. For example, a first VC client instance may be started on mobile device 210A to access management domain 260 and a second VC client instance may be started on mobile device 210A to access management domain 270. All of the applications running in a particular management domain for a particular user will be accessed through the corresponding VC client application running on the mobile device. Additionally, the VC client application's remote connection software running in a mobile device does not expose application generated events running natively within the mobile device to the applications running in their virtual device(s), unless they are specific events from the devices brokered by the VC client application. In this way, rather than executing mobile applications in an actual device (e.g., mobile device 210A, etc.), the applications are run remotely in a virtualization cloud (e.g., virtualization cloud 250) under the watchful eyes of an enterprise's systems and network management tools and their administrators, separate from each other and from the consumer/Internet applications and data.

Figure 3:
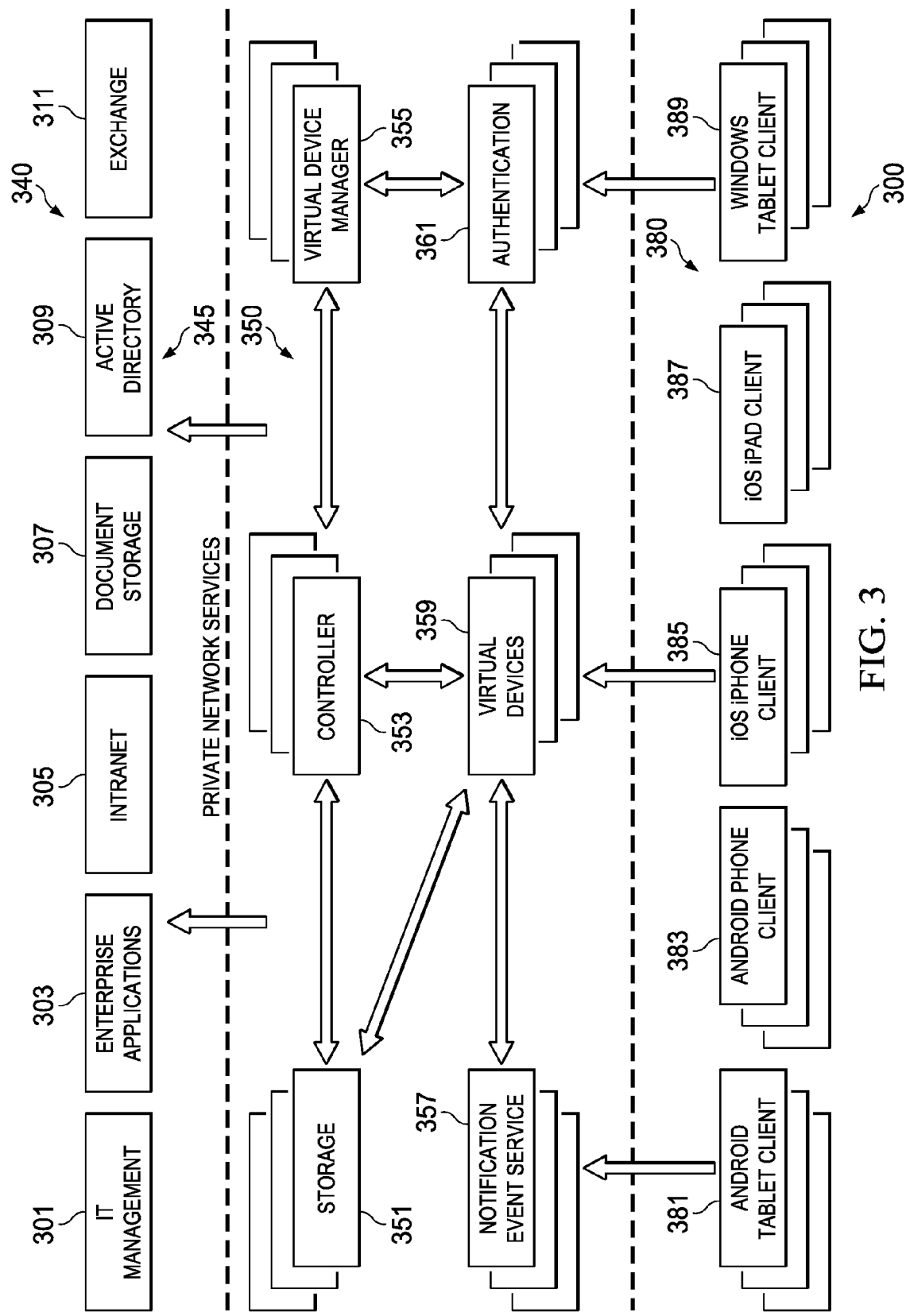
FIG. 3 depicts a diagrammatic representation of an example of a system architecture according to one embodiment.

Turning now to FIG. 3, which depicts a diagrammatic representation of an example of a system architecture according to one embodiment. In this example, system 300 comprises virtualization cloud 350 communicatively connected to private network services 340 and various types of mobile devices 380.

Mobile devices 380 may operate in a distributed computing environment and may operate on various types of operating systems. Similar to mobile devices 110, 210A . . . 210N, 211, 215 described above, each of mobile devices 380 may have a VC client application installed thereon. The installed VC client application may be device-specific. For example, each of Android tablets 381 may have an Android tablet client, each of Android phones 383 may have an Android phone client, each of iOS iPhones 385 may have an iOS iPhone client, each of iOS iPads 387 may have an iOS iPad client, and each of Windows tablets 389 may have a Windows tablet client.

Private network services 340 may comprise enterprise services for private network 345. Non-limiting examples of private network services 340 may include IT management 301, enterprise applications 303, intranet 305, document storage 307, active directory 309, and email exchange 311. These services are known to those skilled in the art and thus are not further described herein.

Virtualization cloud 350 may comprise a plurality of system components, including storage 351, controller 353, virtual device manager 355, notification event service 357, virtual devices 359, and authentication 361. These system components may run on a single server machine or separately on multiple server machines. For the sake of convenience, and not of limitation, FIG. 3 shows each system component running on multiple physical servers.

More specifically, virtual device manager 355 (an application that manages virtual devices) may send a command to controller 353 to create a virtual device. In one embodiment, controller 353 may implement the OpenStack open source cloud computing fabric controller. OpenStack is known to those skilled in the art and thus is not further described herein for the sake of brevity.

In response to the command from virtual device manager 355, controller 353 may first select a golden image, and any applications associated with the golden image. A golden image refers to a virtual machine that was built as a template and that usually contains little, if any, more than the base operating system. A golden image may also be referred to as a gold image, clone image, master image or base image. To create a golden image, an administrator first sets up the computing environment exactly the way it is needed and then saves the disk image as a pattern for making more copies. The use of golden images can save time and ensure consistency by eliminating the need for repetitive configuration changes and performance tweaks. This approach can be compared to automated replication, which requires a configuration management tool to build new images on demand. In a self-service provisioning environment, a collection of golden images may be referred to as a golden repository, gold catalog or golden image library.

Using the selected golden image, controller 353 may create virtual device instance 359 and associate with it a storage location in storage server 351. Storage server 351 holds the persisted, physical storage of each virtual device created by controller 353. Controller 353 may then return the information on virtual device instance 359 to virtual device manager 355.

In some embodiments, each user is assigned one or more virtual devices in one or more management domains when they are provisioned. These virtual "devices" contain applications, their settings and device configuration, as well as any data created locally in the device for the user by any installed applications. The images are maintained in network storage servers (e.g., storage servers 351) within the corresponding management domain(s). In some embodiments, as part of this image, the user is provided an emulated "flash" drive for app storage. The images can also be configured to permit access to external enterprise storage. In some embodiments, storage servers may utilize redundant storage to protect data from failures.

In some embodiments, authentication servers 361 may be configured to provide authentication and session management services. For example, when a user (via a VC client application running on a mobile device that the user is using) attempts to access an enterprise application, authentication server 361 may connect to one or more directory servers (e.g., active directory 309) to authenticate the user's access to virtual device(s) where the enterprise application can be run and to provision the user with one or more virtual devices. After the user authenticates, authentication server 361 may direct virtual device manager 355 to locate a device server that will host the user's virtual device 359. In some embodiments, it may ensure that virtual device 359 is "powered on" as well as initiate the initial session negotiation (via establishment of security tokens) between the mobile device running the VC client application and virtual device 359.

Those skilled in the art will appreciate that a virtual "device" is a not really a device—it is a remote execution environment for all of the services and applications that make up a device. There are (at least) two main classes of device servers, "bare metal" device servers and virtual machine device servers. There are some functional, deployment, and cost differences between these types and so ultimately implementation and market demand will determine their allocation and availability.

The bare metal device servers are made up of a large number of relatively small processing units similar in performance and scale to the processing units of actual mobile devices. Each virtual device instance can run on its own physical central processing unit ("CPU") hardware. In some embodiments, a modified version of the Simple Protocol for Independent Computing Environments (SPICE) protocol server software executes directly in the operating system (OS) on each of these instances to provide remote access.

SPICE is an open source protocol and implementation developed by Red Hat that provides remote access to virtual desktops. SPICE has a well-documented protocol that includes the ability to create new "channels" for different remote services. Embodiments extend the SPICE protocol to provide remote access to virtual devices and to broker access to the sensors of the real (physical) devices.

Virtual machine device servers are server class machines that can be found in the server market today. On the virtual machine device servers, each virtual "device" executes in its own virtual machine on a specially configured Linux device server. In some embodiments, a device server may be configured to provide Transport Layer Security (TLS) and VPN encryption, virtual device instrumentation/auditing, integrity checks and anti-virus from virtualization layer, system-side application management, learning of 'normal' behavior, protocol aware firewall, server-side TPM attestation, SELinux-based virtual device separation, VPN service for applications in the virtual devices, and network proxy for traffic monitoring. Some of these features are further explained below.

In some embodiments, virtual devices hosting Android (or Security Enhancements for Android (SEAndroid)) may be created for each user using Linux's Kernel-based Virtual Machine (KVM) and Quick EMUlator (QEMU).

KVM refers to a kernel-resident virtual machine infrastructure built directly into Linux as opposed to other virtualization techniques that run under Linux as a process. This architecture helps KVM operate very efficiently within Linux. KVM provides completely separate virtual environments for Android devices implementing embodiments disclosed herein. KVM itself does not provide any hardware emulation or remoting capabilities.

QEMU is a user-space emulator that works with KVM to provide the hardware emulation. While QEMU can provide processor instruction emulation, embodiments employ it only for emulating hardware for the virtual device. For example, some embodiments use or provide emulated hardware for touch screen/display, memory/storage, audio, cameras, sensors, bypass, and networking.

Linux and KVM provide the isolation between each user and the applications that they run. It is not possible to communicate directly between the application components and services in these separate virtual containers. Thus, each "device", while sharing physical server hardware, runs independently and is separate from the others, as depicted in FIG. 4.

Figure 4:
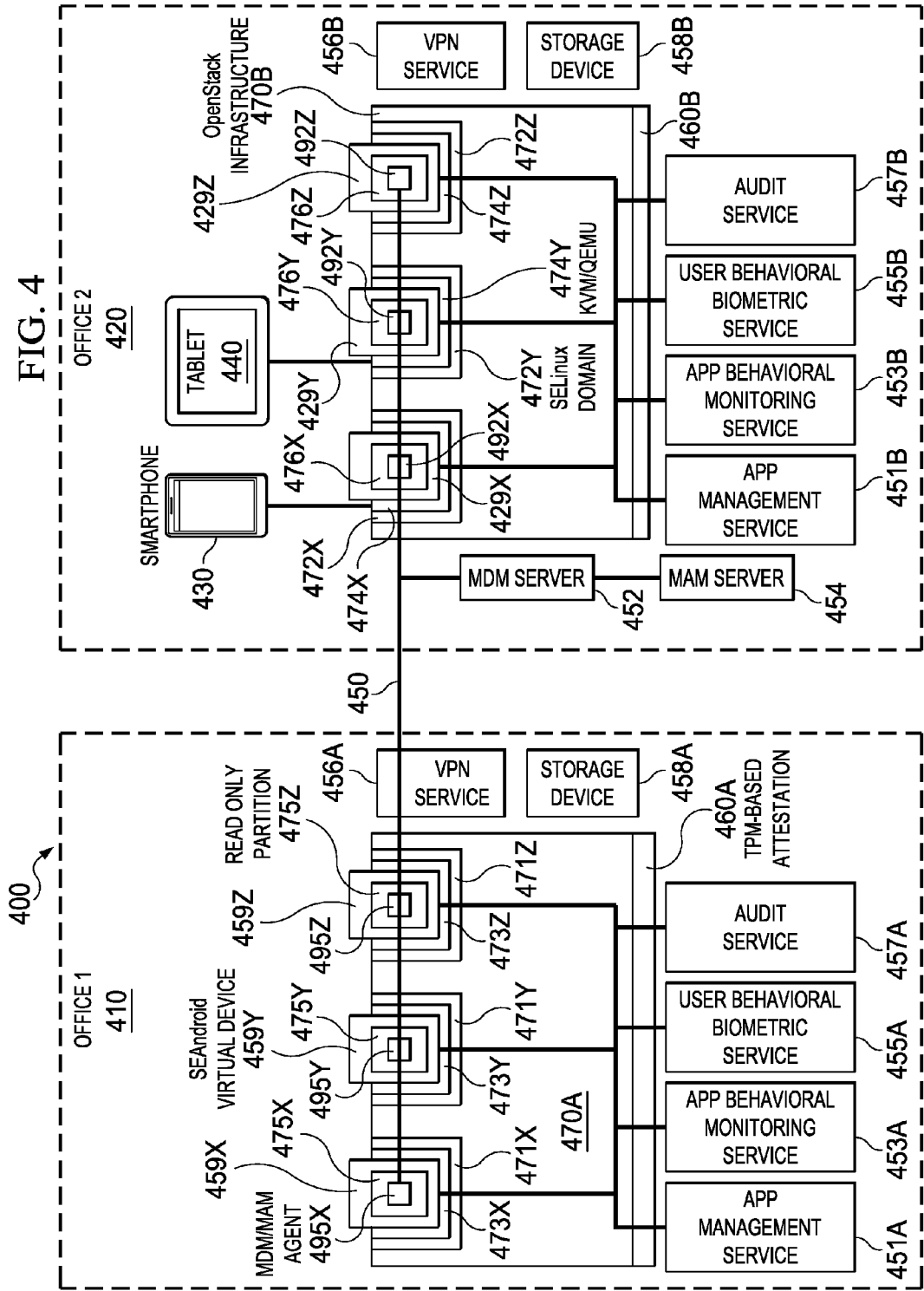
FIG. 4 depicts a diagrammatic representation of an example of virtual device containment and connections according to one embodiment.

FIG. 4 depicts a diagrammatic representation of an example of virtual device containment and connections according to one embodiment. In this example, virtualization cloud 400 may comprise management domain 410 (Office 1) and management domain 420 (Office 2).

Management domain 410 and management domain 420 may be hosted on device servers connected to management network 450 which provides a plurality of network services such as application management services 451A, 451B, application behavioral monitoring services 453A, 453B, user behavioral biometric services 455A, 455B, and audit services 457A, 457B.

Management domain 410 may comprise a plurality of virtual devices 459X, 459Y, 459Z implemented using OpenStack infrastructure 470A on Trusted Platform Module (TPM)-based attestation 460A. Each of the plurality of virtual devices 459X, 459Y, 459Z may include an agent of management network 450 (e.g., agents 495X, 495Y, 495Z, respectively). In some embodiments, the agent may be referred to as a mobile device management and mobile application management (MDM/MAM) agent. In this example, management domain 410 may further comprise VPN service 456A and storage service 458A.

Management domain 420 may comprise a plurality of virtual devices 429X, 429Y, 429Z implemented using OpenStack infrastructure 470B on TPM-based attestation 460B. Each of the plurality of virtual devices 429X, 429Y, 429Z may include an agent of management network 450 (e.g., agents 492X, 492Y, 492Z, respectively). In this example, management domain 420 may further comprise MDM server 452, MAM server 454, VPN service 456B, and storage service 458B.

As illustrated in FIG. 4, each of the plurality of virtual devices 459X, 459Y, 459Z in management domain 410 and each of the plurality of virtual devices 429X, 429Y, 429Z in management domain 420 has a read only partition and its own KVM/QEMU in a particular SELinux domain (e.g., read only partition 475X and KVM/QEMU 473X in SELinux domain 471X, read only partition 475Y and KVM/QEMU 473Y in SELinux domain 471Y, read only partition 475Z and KVM/QEMU 473Z in SELinux domain 471Z, read only partition 476X and KVM/QEMU 474X in SELinux domain 472X, read only partition 476Y and KVM/QEMU 474Y in SELinux domain 472Y, read only partition 476Z and KVM/QEMU 474Z in SELinux domain 472Z).

In the example of FIG. 4, the virtual devices are implemented as SEAndroid virtual devices. SEAndroid may provide benefits such as privileged daemon protection, application isolation, middleware controls, instrumentation and auditing, application install protection, limit application access to sensors, 'untrusted' application sandboxing, read-only core OS partition, centralized patching, and MDM/MAM controls.

In some embodiments, virtual devices can be migrated between device servers by administrative commands (via management network 450), using tools to automate the balancing of load across multiple device servers or based on geographical location.

Each of these virtual devices may be connected to a physical mobile device (e.g., smartphone 430, tablet 440, etc.). In some embodiments, a VC client application running on the physical device may be configured to provide remote two factor authentication, remote signing and decryption, TLS encryption for data in transit, GPS-based access policies, attributes exposed for MDM integration, mechanisms to improve attestation, and/or integration with the mobile device's Mobile Trusted Module (MTM).

When a user is added to a management domain, they are provisioned with a virtual device of a particular type. Similarly, when a user is removed, their virtual devices must be deactivated and their "parts" archived or reclaimed. A separate management server is used by administrators to manage the lifecycle of devices and users of a virtualization cloud (e.g., virtualization cloud 150, virtualization cloud 250, virtualization cloud 350, virtualization cloud 400, etc., collectively referred to hereinafter as the "VC system"). In some embodiments, provisioning services permit administrators to define device "types" (templates) and configurations and assign them to users depending upon the role or duty.

In some embodiment, the management of the VC system and the virtual devices can be controlled through a management policy system. Servers, storage, and virtual devices can be associated with hierarchically arranged policy containers. Policies and access to components can be controlled through these containers and their position in the hierarchy. In some embodiment, these policy containers may be referred to as policy domains and can be used to allocate and delegate control to multiple administration management domains.

For example, consider a hosted VC environment. A hosting partner wishes to support multiple enterprise customers in a single installation. At the same time, they would like to delegate much of the management to their customers. They may choose to create a single policy domain that contains shared resources such as common virtual device images, common device storage, and a shared pool of device servers. For each new customer, they create a sub-domain and grant administrative access to the customers' administrators for their respective sub-domain. In addition, they create a policy in the root domain that all resources are accessible to the sub-domains. The customers' administrators can now create assets (new device image templates, users, administrators, groups) within their own sub-domain. They, in turn, can create their own sub-domains and assign assets, users, groups, administrators, etc. to those sub-domains as well as policies to determine how resources can be inherited from the companies' sub-domain.

If one of these customers wants dedicated server resources to run the virtual devices or to maintain their storage, the hosting partner can add device server and storage server resources to their sub-domain(s) and thus only their virtual devices will be running or be saved on those server assets. Similarly, those systems might have different networking characteristics that would let them share a VPN connection to the enterprise as opposed to configuring a VPN within each of the virtual devices.

This organization can also be beneficial to enterprises that need to delegate management functions to different departments within their enterprise yet want to control and maintain the overall infrastructure centrally.

When migrating a user between two templates, the VC system can support intelligent upgrading, including:
Scheduling specific times for upgrades to occur.
Roll back to a previous device template if an error occurs.
Partial, incremental upgrade processes across a user population.
Detection of whether a user is active on a virtual device before enacting the upgrade.
Graceful shut down of a virtual device for which an upgrade is being forced.

As a non-limiting example, in some embodiment, a provisioning and management server for the virtual machine device servers described above can be built on top of a virtual datacenter management platform such as OVirt, OpenStack, or the like. OVirt and OpenStack are known to those skilled in the art and thus are not further described herein. OVirt provides the underlying data services for managing and accessing virtual machines. The VC system provides an abstraction interface that hides much of the complexity of the underlying virtual datacenter management platform when trying to manage multiple management domains within a single system. In some embodiments, SPICE may be integrated into the virtual datacenter management platform, allowing users to connect to virtual machines through SPICE.

In some embodiments, an administrator might want to allow users to access a mobile virtual device without a persist state of the virtual device beyond a given user's session. In this case, the virtual device may be deleted when the session ends. In some embodiments, the virtual device may optionally warn the user that the virtual device is operating on a kiosk mode when the user logs in, and delete the virtual device when the user logs out. Essentially, the kiosk mode provides a 'fresh' virtual device based on a specified template each time a user logs in.

In a variant of the kiosk mode, a virtual device can be set to synchronize certain enterprise data (e.g., recent email) when the user logs into the kiosk mode device, but the virtual device is still deleted when the user logs out. In this way, any new enterprise data is placed back into the enterprise applications that should own each respective data type. This allows the user to move between server node clusters (e.g., moving between countries) without concern about moving or synchronizing virtual device state between the different servers.

The VC system may support additional modes of operation. For instance, a published app mode may enable an organization to offer specific applications in remote 'containers' to large user populations. An example would be a bank using the published app mode to make an online banking application available to its customers, while hosting that online banking application in their own data centers on their own locked down OS image.

In such a published app mode, the end client application icon can be customized to enable white labeling. For example, when the user logs in, the published application is already open and in focus. When the user quits the application, the remote connection closes. In some embodiments, the published app mode can be coupled with the kiosk mode described above such so that the virtual device does not have a persist state.

In some embodiments, an organization may wish to provision a virtual device (whether a full device, kiosk mode, published app, etc.) to a person not employed by that organization, and the user need only download a VC client application or add the account to their existing VC client application on their mobile device(s).

In some embodiments, an organization may wish to provision one or more virtual devices to one or more employees at a partner organization. In this case, the publishing organization can liaise with the consuming organization to add a VC client application and/or set of authentication settings to the consuming organization. One of the advantages of this approach is that the publishing organization can leverage the user provisioning and authentication mechanisms of the consuming organization. For example, access to the VC client application can become a setting in the consuming organization's active directory, and users in the consuming organization must already have authenticated to the consuming organization in order to have access to the publishing organization's applications/virtual devices.

In this scenario, doing two remoting steps would add latency and complexity to the VC system. To avoid this, when the user connects to the publishing organization's virtual device, the VC client application on the user's physical device can connect to the publishing organization's VC servers via a bypass channel in the VC server of the consuming organization.

As described above, SPICE can create new "channels" for different remote services. Different types of data can be communicated between a mobile device running a VC client application and a virtual device running in the VC system via different SPICE channels. These SPICE channels are mapped to virtual input/output channels.

Figure 5:
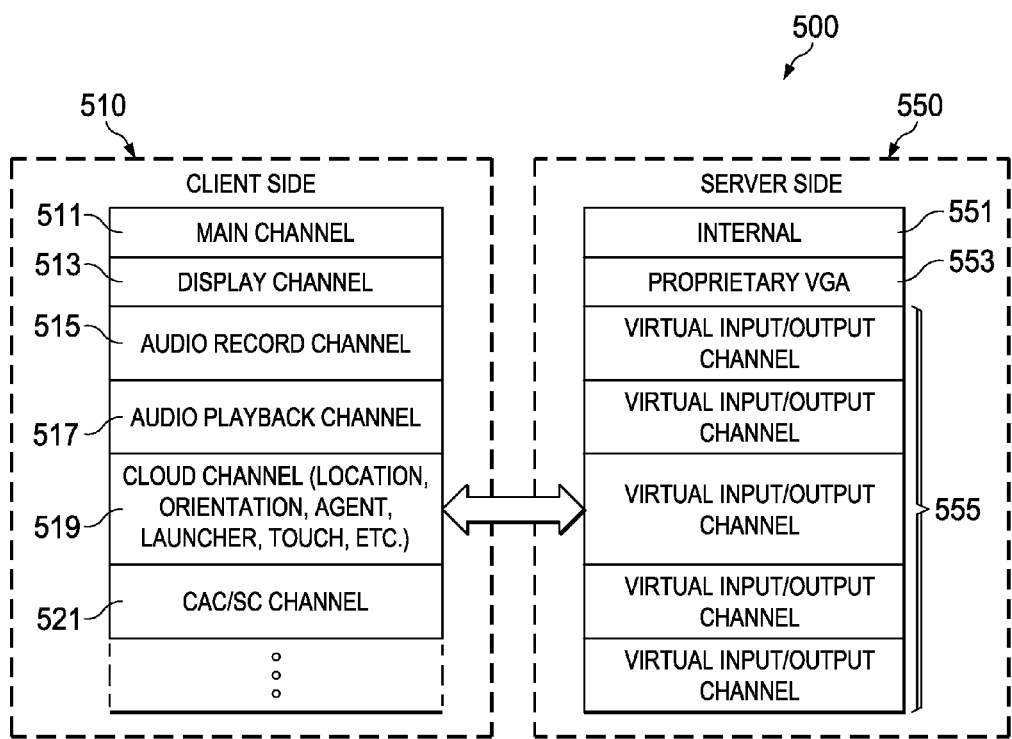
FIG. 5 depicts a diagrammatic representation of an example of a channel based device mapping architecture according to one embodiment.

FIG. 5 depicts a diagrammatic representation of an example of channel based device mapping architecture 500 according to one embodiment. In this example, data (e.g., display data, audio data, location data, etc.) may be communicated from a mobile device (e.g., client side 510) via various SPICE channels (e.g., main channel 511, display channel 513, audio record channel 515, audio playback channel 517, cloud channel 519, Call Admission Control (CAC)/Signaling Controller (SC) channel 521, etc.) to a server in the VC system (e.g., server side 550). Channel based device mapping architecture 500 may include a virtual device mapping module embodied on a non-transitory computer readable medium and configured for mapping the incoming data to appropriate virtual device component (e.g., internal component 551, proprietary video graphic adapter (VGA) 553, etc.) and/or virtual input/output channels 555, each associated with a particular virtual driver. This is further described below with reference to FIG. 6.

FIG. 6 depicts a diagrammatic representation of an example of virtualization server software architecture according to one embodiment. As a non-limiting example, virtualization server software architecture 600 may implement a modified version of Android OS.

As illustrated in FIG. 6, virtualization server software architecture 600 may comprise a plurality of software components. At its core is a Linux kernel with specialized core drivers 630 to abstract the hardware layer from the application runtimes. Channel data 610 are received into a virtual device's KVM/QEMU 620, mapped via virtual input/output channels 639, and handled by corresponding virtual device drivers (e.g., display driver 631, universal serial bus (USB) driver 633, disk driver 635, binder/inter-process communication (IPC) driver 637, camera driver 632, input driver 634, power management 636, and network driver 638, etc.). These "virtual" device drivers replace the drivers for a real device and communicate using QEMU and the SPICE protocol with a VC client application executing on the mobile device for access to the real devices and the services they provide.

Virtualization server software architecture 600 may further comprise a collection of libraries for accessing data, working with text and graphics, encryption and communication, and the underlying OS. In the case of Android OS, each virtual device session includes a full complement of Android's application framework, libraries, runtime, and applications. However, some kernel-based services provided within a virtual device server are modified. For example, power management services are simulated and significantly altered as battery support is not an issue in a virtual device. User interface (UI) indicators for batteries and other elements not applicable to the virtual device can be made to reflect the values of the client device.

As another example, applications running in a virtual device do not use the local device's WiFi or data network. Instead, they use the Internet Protocol (IP)-based network services provided by the virtual device servers. In some embodiments, an "always-on" network interface may be provided to the applications. WiFi and data connectivity management applications the user may install in the virtual device may have no relevance.

Virtualization server software architecture 600 may include additional virtual drivers not shown in FIG. 6. Many of the virtual drivers may communicate with a VC client application running on a mobile device using extensions to the SPICE protocol. Some are designed to improve performance whereas others provide access to features expected in a mobile device. Some example virtual drivers are further described below.

Virtual sensors driver—provides access to the remote client's sensor devices such as the GPS, the gyroscope, the accelerometer, a compass, battery level, WiFi signal strength, and 3G/4G signal strength. Other sensor types can be added as needed.

When an application requests access to a sensor such as the GPS, the sensors driver sends a device message that results in a sensor request being sent to the remote client. The remote client application then makes a similar request to the physical device and begins forwarding sensor data back to the sensor driver as the sensor produces data. When the application no longer needs the sensor information, a close request is sent back to the client where it then stops monitoring the specified sensor.

Some sensors, such as the GPS, can draw significant battery power while running. To prevent unnecessary battery drain, the VC client application running on the physical mobile device can request that the GPS on the local mobile device be turned on or off based on the requirements of applications running on the virtual device in the VC system.

Some sensors such as the accelerometer may change values very frequently. The VC client application can be configured to sample and relay accelerometer values from the local physical device based on attributes and requirements of the app running on the virtual device in the VC system as well as the performance of the network connection between the local and virtual devices (higher network latency and lower available bandwidth result in fewer sensor values being communicated).

A specific example of this is in how the VC system synchronizes the orientation of the remote virtual device to the orientation of the local device by continually monitoring and relaying orientation change events on the accelerometer on the local device, while not relaying every minor rotation of the device all the time even if the application on the remote virtual device is not monitoring the accelerometer data.

Additional sensors that the VC system can remote from the local device to the virtual device may include the network type, network signal strength, battery charge remaining, light sensor (used for screen diming), Bluetooth, peripheral device connectivity and the state of any local payment credential.

Virtual touchscreen driver—supports remoting of multi-touch actions and also gestures. Multi-touch gestures can be used for zooming, rotating and other similar operations. In one embodiment, the SPICE mouse channel may be modified for this purpose. In some embodiments, a designated channel is used for this purpose.

Audio and video bypass driver—improves the performance of audio and video processing for both the VC server and the VC client. While embodiments can work without bypass, there is a CPU cost on both the client and the server when using the internal video processing of the host operating system (e.g., Android). To this end, modified media framework 645 is provided to replace audio and video players that came with the OS with special players that implement the bypass functions. For example, when an application requests to play a video using the Android video player (either full-screen or embedded), the bypass video player captures either the video data or an Universal Resource Locator (URL) that points to an address where the actual video file resides, and passes it via the bypass driver to the remote client. The client then spawns a local video player and plays the video stream. In the case of network video sources, the entire stream can be handled outside of the virtual device via a network proxy. More details of audio and video bypass mechanisms are provided below.

Audio bypass works much like video bypass. The audio player is replaced to provide proxy access to audio data in the client.

Virtual camera driver—remotes a camera using a combination of a virtual camera device driver and modifications to the camera functions in the media framework. When the camera activity or fragment is loaded in the virtual device, the modified camera viewer and virtual camera driver sends a request to the client to bring up the camera. Once a picture is taken, the picture or video is sent to the virtual device server where it can be placed in the flash storage of the virtual device or can be delivered to an anti-virus scanner and then placed in enterprise storage.

Virtual display driver—optimizes delivery of graphics to a remote client. More specifically, the graphics layer can be instrumented to generate messages via a virtual display driver instead of writing directly to a frame buffer. In some embodiments, surface manager 641 in libraries 640 is implemented to handle partial updates to the Android display. In some embodiments, surface manager 641 may work in conjunction with graphics API 643 to provide acceleration for various commands issued by applications and the Android OS.

These and other virtual drivers support remote access for applications 660 running on application frameworks 650 in the virtual device. Operation of the virtual device, including processes associated with applications 660, as well as user behaviors can be monitored via various components in application frameworks 650 (e.g., resource manager 651, location manger 653, agent 655, notification manager 657, activity manager 659, content providers 661, telephony manager 663, package manager 665, window manager 667, system view 669, Extensible Messaging and Presence Protocol (XMPP) communications service 671, etc.), some of which will be further described below.

One concern when implementing a virtual mobile device platform for mobile devices relates to network latency. Latency in accessing a remote operating system can cause significant user frustration, especially on slower networks. Techniques that reduce network latency have great value to the user, and ultimately to the manufacturer of the remote access technology. One approach to deal with network latency is to bypass elements or functions on a remote virtual machine. Examples of this approach include moving elements of the user interface from the remote virtual machine to the local physical device, bypassing a media player on a virtual machine, and bypassing certain telephone functions on a virtual machine and instead performing those functions on the physical device. Other examples are also possible, as one skilled in the art would understand. Following are descriptions of several approaches for addressing network latency.

A first approach relates to a multimedia bypass mechanism. Playing video (or audio) in a remote virtual machine presents a significant challenge for several reasons. First, the audio and video streams often get out of synchronization, as the two data streams are delivered through different channels and mechanisms. Second, video is typically decoded and played on the virtual device, then re-encoded to send to the client device. The video re-encoding occurs in real-time, and the virtual device doesn't know what is coming next in the screen buffer, so there is no forward caching of the video content, which would help deal with network performance issues. The system re-encodes the video stream in real time, whereas asynchronous video encoding can use various techniques to optimize video encoding compression. The real-time re-encoding means the video stream at the client device is often poor quality and requires more data traffic than the source video file.

Generally, one technique for addressing these problems focuses on avoiding the video decoding and re-encoding at the virtual device by means of a video bypass mechanism. In this example, when the virtual device recognizes content as being video, the virtual device simply acts as a proxy, forwarding the video stream to the client application on the client device, where the video is played using a video player on the client device.

To fully understand the multimedia bypass mechanism, it is helpful to understand how the virtualized system operates without using the video bypass mechanism. A VC client that connects to a VC server will typically require that multimedia data such as audio and video data be decoded and rendered on the backend system (at the VC server) and then be re-encoded and sent to the client for (a second) decode and rendering. Since multimedia content is commonly encoded using lossy compression codecs to reduce the data size, this additional re-encoding of the data will result in a worse quality-to-bitrate ratio than the original content. Also, this additional decode, render, and re-encode requires additional computational resources on the backend system.

One goal of the multimedia bypass system is to avoid unnecessary multimedia data re-encodes, when possible. This will provide the maximum multimedia quality and performance to the VC client over network connections of limited and varying performance and avoid unnecessary computational resources to decode, render, and re-encode the multimedia data.

As described above with respect to FIG. 6, customizations to the OS media framework (media framework 645), QEMU parameters, and SPICE code provide the implementation mechanisms to bypass the decoding and rendering of the multimedia data on the virtual device and instead route this data to the client for decoding and rendering. When the bypass mechanism is active, it routes the data from the virtual device to a virtual serial device provided by the hypervisor to the virtual device audio or display channel handling code, which then sends the data on to the client.

Figure 7A:
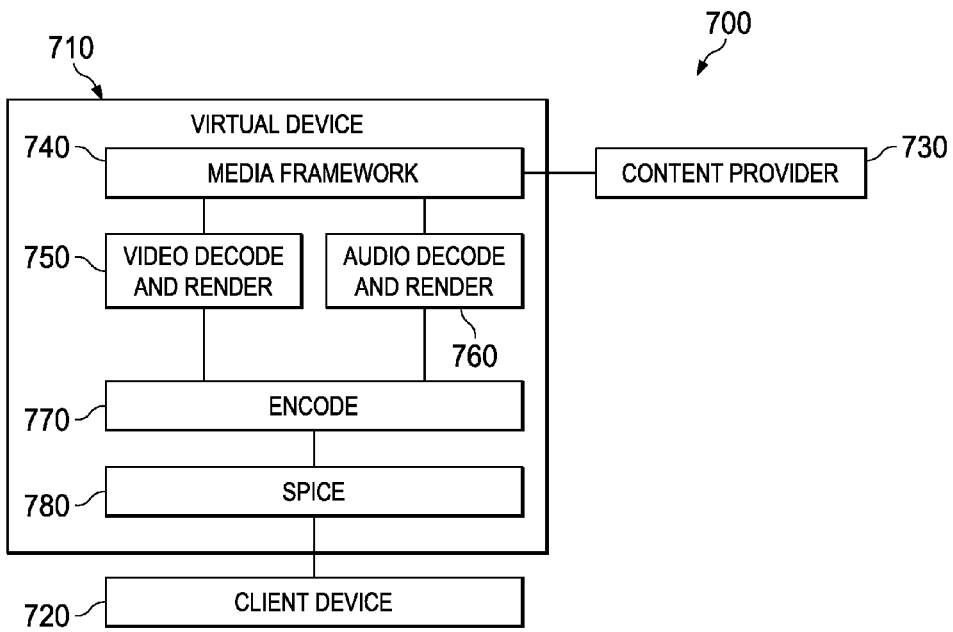
FIGS. 7A and 7B depict diagrammatic representations of an example of virtualization server software architecture that enables a multimedia bypass system according to one embodiment.
Figure 7B:
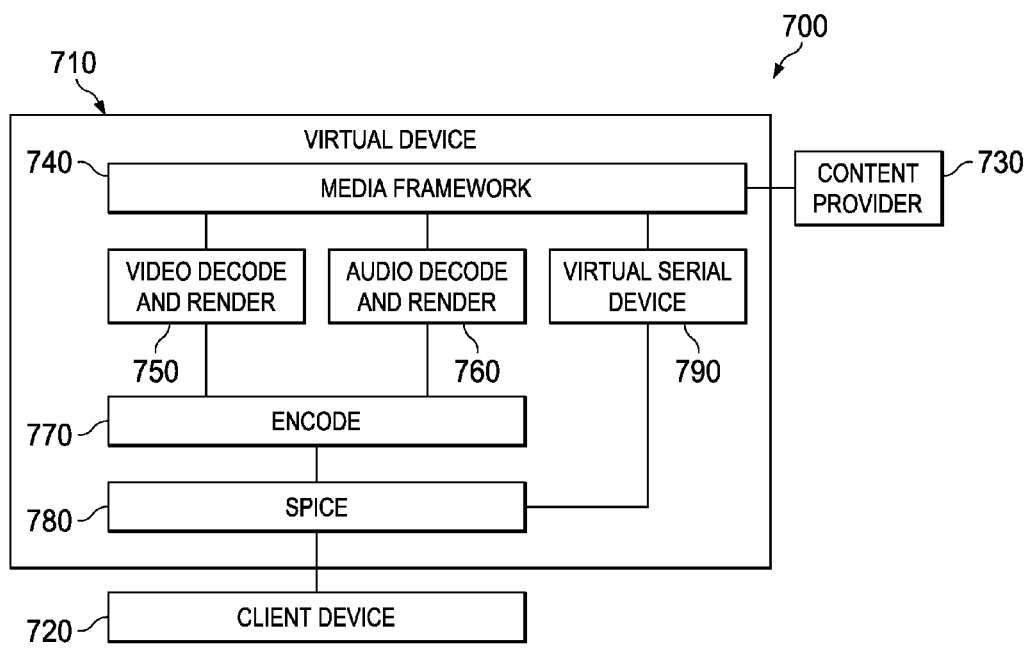

FIGS. 7A and 7B are functional block diagrams depicting an example of virtualization server software architecture according to one embodiment that enables a multimedia bypass system. FIG. 7A depicts virtualization server software architecture without a multimedia bypass mechanism. FIG. 7A shows a virtual device 710 and a client device 720. When a user of the client device 720 does something that requires multimedia content from content provider 730, the virtual device 710 will make a connection to the content provider 730, and receive multimedia data. The received multimedia video data is decoded and rendered at block 750. The received multimedia audio data is decoded and rendered at block 760. The decoded and rendered multimedia data is then re-encoded at block 770, so it can be sent to the client device 720 via a SPICE display channel (block 780). As mentioned above, the multimedia received by the client device using the system illustrated in FIG. 7A may have a reduced quality and require more data traffic than the source video file, due to the extra decoding and re-encoding steps.

FIG. 7B depicts virtualization server software architecture with a multimedia bypass system. As with FIG. 7A, FIG. 7B shows a virtual device 710 and a client device 720. When multimedia content is accessed from content provider 730, the virtual device 710 will make a connection to the content provider 730, and receive multimedia data. However, instead of decoding and re-encoding the multimedia data, the received multimedia data is routed to a virtual serial device 790 and then to the virtual device SPICE display channel (block 780), which then sends it to the client 720. As a result, the client 720 will receive the multimedia content as if it was provided directly from the content provider 730, without any unnecessary encoding and decoding steps.

FIG. 8 depicts a flowchart of a multimedia bypass mechanism process, according to one embodiment. The process begins at step 810, where the virtual device receives a request for multimedia content, such as video and audio content from a content provider. At step 812, a connection is established between the virtual device and the multimedia content provider. As mentioned above, without a multimedia bypass mechanism, the received multimedia data would be decoded and re-encoded, as illustrated in FIG. 7A. To improve network latency and video quality, the multimedia data is not decoded and re-encoded at the virtual device. Instead, the multimedia data received from the content provider is routed to the client device (step 814). In one example, the multimedia data is routed to the client device via a virtual serial device and a SPICE display channel. At the client device, the multimedia data is decoded, rendered, and played (step 816).

Mobile device network connections can vary in performance depending on external uncontrollable conditions. Also, some multimedia content providers use a technique called adaptive streaming to dynamically adjust the stream bitrate and quality to best match the network connection between the content provider and the endpoint. Also, the VC system described above allows users or administrators to apply network performance limitations on metered data connections to lower data costs.

In some embodiments, the VC system includes a network performance monitor. The custom network performance monitor provides several functions, including:
 monitoring the quality and performance of the client device to virtual device server connections;
 monitoring the buffer levels and underrun count of the client media playback; and
 keeping synthetic network constraints given by a user setting (typically due to metered data connections) to the backend system.

The system that uses data collected by the network performance monitor and other resource performance monitors takes various actions throughout the system to make optimal adjustments for varying system resource conditions.

In some examples, the client bandwidth available for multimedia streaming may be lower than the bitrate of the source stream (plus some added margin). In some examples, when performing adaptive streaming, a lower bitrate multimedia stream can be selected. But even then, the possibility exists that the lowest bitrate multimedia stream provided by the content provider will still exceed the capability of the client network connection. In these cases, the VC performance manager will send a command to the virtual device to disengage the multimedia bypass system. In this case, the multimedia data will be decoded and re-encoded for the client device, as shown in FIG. 7A. In some examples, a proprietary stream might be playable by the virtual device, but not by a specific handset due to a missing codec on the client. In these examples, the multimedia data will be decoded and re-encoded for the client device, as shown in FIG. 7A. This condition can be detected in any desired manner. In one example, if it is detected that the client device fails to play the media stream, the multimedia bypass system can be disengaged. In another example, when the virtual device requests content from a provider, there can be some negotiation relating to the stream and the supported media types. Then, the system can check the encoded content type against the client supported types, and fallback to transcoding if the client doesn't support the content type.

Typical mobile devices support at least the following playback methods:
adaptive multimedia streaming using open protocols;
mounted filesystem media playback; and
proprietary adaptive streaming.

Following are descriptions of various VC multimedia bypass techniques to handle the three playback methods listed above. Other examples are also possible, as one skilled in the art would understand.

With respect to adaptive streaming, it is helpful to understand the workings of a typical adaptive streaming system. Various online multimedia streaming content providers (such as TED Talks, YouTube, etc.) use various methods to stream data to client endpoints that will consume and render multimedia data. Modern streaming systems such as these use adaptive streaming techniques that allow the bitrate (and thus the quality) of the video stream to adapt to the quality and performance of the network connection and the performance of the endpoint's rendering system. Various live streaming protocols that support these techniques require protocol compatibility and support on both the client/endpoint and server/provider. These techniques collect network statistic data on both sides of the connection and sometimes collect the endpoint's rendering performance data.

The first playback method listed above (adaptive multimedia streaming using open protocols) can be virtualized using the following example. Other examples are also possible.

On a generic VC system, the respective virtual device instance acts as the client endpoint from the perspective of the streaming multimedia content providers. So, by default, the quality of the network connection between the virtual device instance and the content provider is used by the adaptive streaming techniques. However, if the bypass mechanism described above is used, the decoding and rendering is skipped and the multimedia data forwarded to the client device. Now, the full network path between the content provider and endpoint client (the VC client device) renderer needs to account for the connection quality between the virtual device instance and the client device. Additionally, other data required by the multimedia adaptive streaming system protocol, such as the client device renderer's buffer levels, number of underruns, etc., would also need to be accounted for. The VC virtual adaptive streaming system described here provides this functionality.

In the VC system, like any typical virtual machine (VM) system, a client device connects to a backend virtual device instance over a network connection. The data collected by the previously described VC network performance monitor includes the network quality information required by commonly used live multimedia streaming protocols such as RTSP/RTCP, HLS, and MPEG DASH, for example. The client device can also provide multimedia rendering performance feedback, including data required by these common multimedia streaming protocols, to the backend system.

In some embodiments, the custom OS (e.g., an Android OS in some embodiments) running in the virtual device instance is configured to receive the virtual device to client network and rendering performance statistics. In the example depicted in FIG. 7B, the virtual device to client network path is the path between the SPICE channels 780 and the client 720. These network statistics are then accumulated with the network statistics of the connection between the content provider and the virtual device instance to derive the necessary full path network connection statistics (rather than just the connection statistics between the virtual device instance and the content provider). In the example depicted in FIG. 7B, the virtual device to content provider network path is the path between the virtual device 710 and the content provider 730. In the example depicted in FIG. 7B, the 'full path' network connection is the combined path between the content provider 730 to the client 720 via the virtual device 710. The derived network statistics and the client rendering data are then provided as needed to the active streaming protocol used by the VM's custom OS and the content provider. In this way, the adaptive streaming flow control functionality is virtualized.

FIG. 9 depicts a flowchart of a process for multimedia bypassing, according to one embodiment, where adaptive streaming is used by a content provider. The process begins at step 910, where the virtual device collects the network statistics for the path between the virtual device and the content provider. At step 912, the virtual device collects the network statistics for the path between the virtual device and the client, which in the bypass mode, is the path that bypasses the decoding and encoding blocks. From the collected network statistics from the two paths, the full path (the path between the content provider and the client) network statistics are derived (step 914). Client rendering data is also collected at step 916. At step 918, the derived statistics and client data are provided to the VM's custom OS and the content provider, for use by the adaptive streaming system.

The second playback method listed above (mounted filesystem media playback) can be virtualized using the following example. Other examples are also possible. For mounted filesystem multimedia playback, custom code added to the android media framework sends multimedia information (such as resolution and frame rate for video) to the VC performance manager, which will make an initial determination of whether or not the media playback will be started in a multimedia bypass state. If so, then the VC network monitor will continue to monitor the playback connection and the VC performance manager will make the multimedia playback bypass disengage decisions as needed.

The third playback method listed above (proprietary adaptive streaming) can be virtualized using the following example.

Some apps running on the virtual device may use their own proprietary adaptive streaming protocol, instead of a known protocol provided by the OS. In these examples, it may be impractical to modify the connection statistics that get sent back to the content provider's server. For these examples, where the OS does not modify the adaptive streaming decisions of the app and streaming service, the virtual device can throttle the bandwidth of the virtual device network connection to the internet (using the Linux kernel network emulation netem functionality for example)

to more closely match the performance of the connection between the client and server upon with the virtual device instance is running.

In this way, the proprietary adaptive streaming algorithms perform their normal adjustments to best match the incoming stream with the network performance. Since its network connection is being throttled to match (or be slightly less than) the performance of the client/server connection, the correct stream should be selected by the adaptive streaming algorithm. As with other multimedia bypass methods, the VC performance manager will disengage the bypass mode if the VC client connection performance degrades beyond a certain level.

Referring again to FIG. 7B, it is desired, in this example, that the speed (e.g., bitrate, etc.) of multimedia data received from the content provider 730 be such that it is optimized for the speed upon which the client device 720 can receive it. However, the adaptive streaming system of the content provider 730 only sees the network speed between the content provider 730 and the virtual device 710. So, the virtual device 710 determines the network speed between the virtual device 710 and client 720, and then slows down the network speed between the virtual device 710 and content provider 730. In response, the adaptive streaming system of the content provider 730 will optimize the stream for the speed that it detects, which will now match the speed that the client device 720 can receive the stream.

FIG. 10 depicts a flowchart of a process for multimedia bypassing, according to one embodiment, where proprietary adaptive streaming is used by a content provider. The process begins at step 1010, where the virtual device 710 (see FIG. 7) determines the network speed between the virtual device 710 and the client 720 by collecting network statistics. At step 1012, the virtual device 710 slows down the network speed between the virtual device 710 and content provider 730, to approximate the network speed determined in step 1010. In response, the proprietary adaptive streaming system used by a content provider 730 will optimize the multimedia stream for the network conditions that it sees which will therefore be optimized for the network conditions between the client 720 and virtual device 710. Note that this technique may also be used for non-proprietary adaptive streaming systems, such as the examples provided above.

Note that for all of the techniques described above, any desired buffering and caching techniques may be used. For example, forward buffering may be used for smoother multimedia playback at the client device. In another example, when not bypassing the virtual device, the virtual device may use forward caching and encode its buffered data and then send the encoded buffered data to the client device.

Another approach for addressing network latency focuses on moving elements of the user interface from a remote virtual device to the local client application on the user's physical device. One example is a local application launcher for launching applications on a remote virtual device, described below. Another example is a keyboard bypass mechanism, described in detail below.

Some approaches include moving the user interface layer for a remote virtual application to a local client device to minimize the impact of network latency. For example, one method moves Android user interface widgets and other user interface elements from the remote server to the local client application running on the user's physical device. In another method, the user interacts with an application running on the client device, but all business processes and application logic are executed by the remote mirrored user interface running in the virtual device. In another method, the user interface of the remote application running in the virtual device is broken down into small image squares and those screen fragments are stored in memory in the client application on the physical device. In another method, the user's interaction with the UI happens locally, with scrolling, zooming in and out, etc. being rendered in the client application on the local device, as opposed to the user having to wait for the screen updates to be sent across the network. In another method, user interface actions in the client application and user interfaces are sent to the remote virtual device so that screen display consistency can be maintained (between the client application and the remote virtual device).

In another method, screen image fragments likely to be required by the user are predicted and sent ahead of time to the client application. In another embodiment, the screen image fragments are stored in volatile (transient) memory in the client application, but are not stored at rest. In another embodiment, the screen image fragments are stored in non-volatile memory in the client application. These screen image fragments can be encrypted at rest, requiring one or more encryption keys to open the files.

In another embodiment, the encryption key to open a client device's screen image fragment cache store is retained in volatile memory during an authenticated session. In another embodiment, the encryption key(s) to open a client device's screen image fragment cache store is retained in non-volatile memory, but requires a user authentication step to access the encryption key.

In one of the examples listed above, the client application can include a local application launcher. Normally, the user would see views of the normal OS (e.g., Android) application launch running on the virtual device. However, a user would experience latency when scrolling through the available application icons and pages, since the scrolling actions and updated views would have to travel across the network before the results are displayed on the client device screen.

In one embodiment, the client application allows a user to locally run an application launcher. The local application launcher downloads a listing of all available applications installed on the virtual device, including names of the applications and/or their icons. When the local application launcher is run, the user is able to scroll through the available applications, without any latency, since at that point, nothing is being sent to or received from the remote virtual device. When the user selects an application by pressing on its icon, for example, the client application sends the appropriate message to the virtual device, and the selected application is launched on the remote virtual device. Once the application is launched, the client device's display can be seamlessly switched back to the virtual device display, rather than the local application launcher.

Another approach for addressing network latency relates to the use of a soft keyboard on the physical client device. When providing remote access to an operating system designed for touch enabled mobile devices, there is no immediate feedback upon pressing a key on a soft keyboard. On a conventional keyboard, the user can feel the keys on the keyboard, but on a touch screen there is just one continuous surface with no physical clues to the edge of the keys. This leads to the user more frequently hitting the wrong key, and the delay in the remote connection can mean that the user doesn't recognize the error until several further 'touchstrokes' have been pressed. The local client device does not normally recognize text entry to the remote operating system. In one example, all touch events are just relayed to the remote operating system, and only the remote operating system recognizes the touch events as typing based on the application context in the remote operating system. This approach focuses on recognizing when the user is typing with a soft keyboard in the remote operating system, and then causes a client-side local keyboard overlay in the client application that has no delays due to network latencies, effectively bypassing the virtual soft keyboard on the remote virtual device.

One example of the operation of a virtual device keyboard bypass mechanism follows. The operating system on a virtual device server transmits a signal to the client device through the transport network medium anytime an application on the virtual device requests the on-screen keyboard. Likewise, the virtual device server also transmits a signal to the client device when the application no longer needs the on-screen keyboard.

The operating system on the server is programmed to suppress the soft keyboard from launching on the virtual device server when an application requests a keyboard. Instead, the operating system provisions the soft keyboard area for a keyboard view and all touch inputs within a boundary will be ignored by the operating system. The touch inputs within the boundary on the virtual device view are ignored, since keyboard inputs will be received from the client device keyboard instead.

The keyboard request signal (mentioned above) from the server to the client device consists, in one example, of information, not limited to, the screen boundary that will be occupied by the on-screen keyboard, the keyboard style (country specific—Dollar/Pound/Euro/Yen symbols), the keyboard language (English, Spanish, etc.), the dictionary entries supported by the keyboard program together with their score values, settings for the keyboard (sound on keypress, vibrate on keypress, auto-capitalization, auto-correction, etc.), support for keyboard gestures (e.g., swipe), accessibility control information (e.g., to interact with headphones to read out passwords, keyboard buttons settings—width, height, horizontal gap, vertical gap), mode of the application's keyboard needs (e.g., text, url, email, phone, number, date, etc.).

Any changes to any of the information listed above, while the session is in progress, will also be transmitted from the server to the client device. An exemplary scenario that can trigger a change to the keyboard request signal is when a user switches their client device to a different device with a different screen resolution, or the user manually changes the behavior in the server's operating system's settings. Other scenarios are also possible.

On receipt of the keyboard request signal at the client device, a control program on the client device will invoke a built-in soft keyboard or invoke one of the soft keyboards already available on the client device. This soft keyboard will be invoked with all the information gathered from the signal received from the server. This soft keyboard invoked on the client device will be juxtapositioned in place of the keyboard that the server would have projected in the operating system's view. From a user perspective, the appearance of the soft keyboard on the client device will be similar to the appearance of the soft keyboard had it been presented in the operating system's view on the server.

The control program on the client device will capture all the user's keyboard inputs, and send these inputs back to the virtual device operating system on the server through the transport network medium. Based on the keyboard settings information received from the server as described above, the user of the client device will receive a combination of visible, audible and tactile feedback for every key pressed. Depending on the information received as described above, the user will receive appropriate feedback directly on the client device, as configured on the accessibility settings in the virtual device operating system. The operating system will receive the keyboard inputs sent by the control program on the client device and deliver these keyboard inputs to the application on the server that initially requested the keyboard input. Any updates to the dictionary wordlist as entered by the user will also be sent back from the control program on the client device to the virtual device operating system on the server to be appropriately updated on the dictionary wordlist on the server.

As a user is typing into the soft keyboard at the client device, there may be latency between pressing a key and the application display showing the letter, number, symbol, etc. that was pressed, since it takes time for the key presses to be sent to the VM, and the application views sent to the client device. In one example, as keys are pressed at the client device, the entered key is immediately displayed in the application view on the client device at the current location of the cursor. As the 'real' application views are received at the client, the client display can be updated to reflect the actual application views. This way, the user will get immediate feedback as the user is typing, but will still eventually view the actual application views from the application running on the virtual device.

Figure 11:
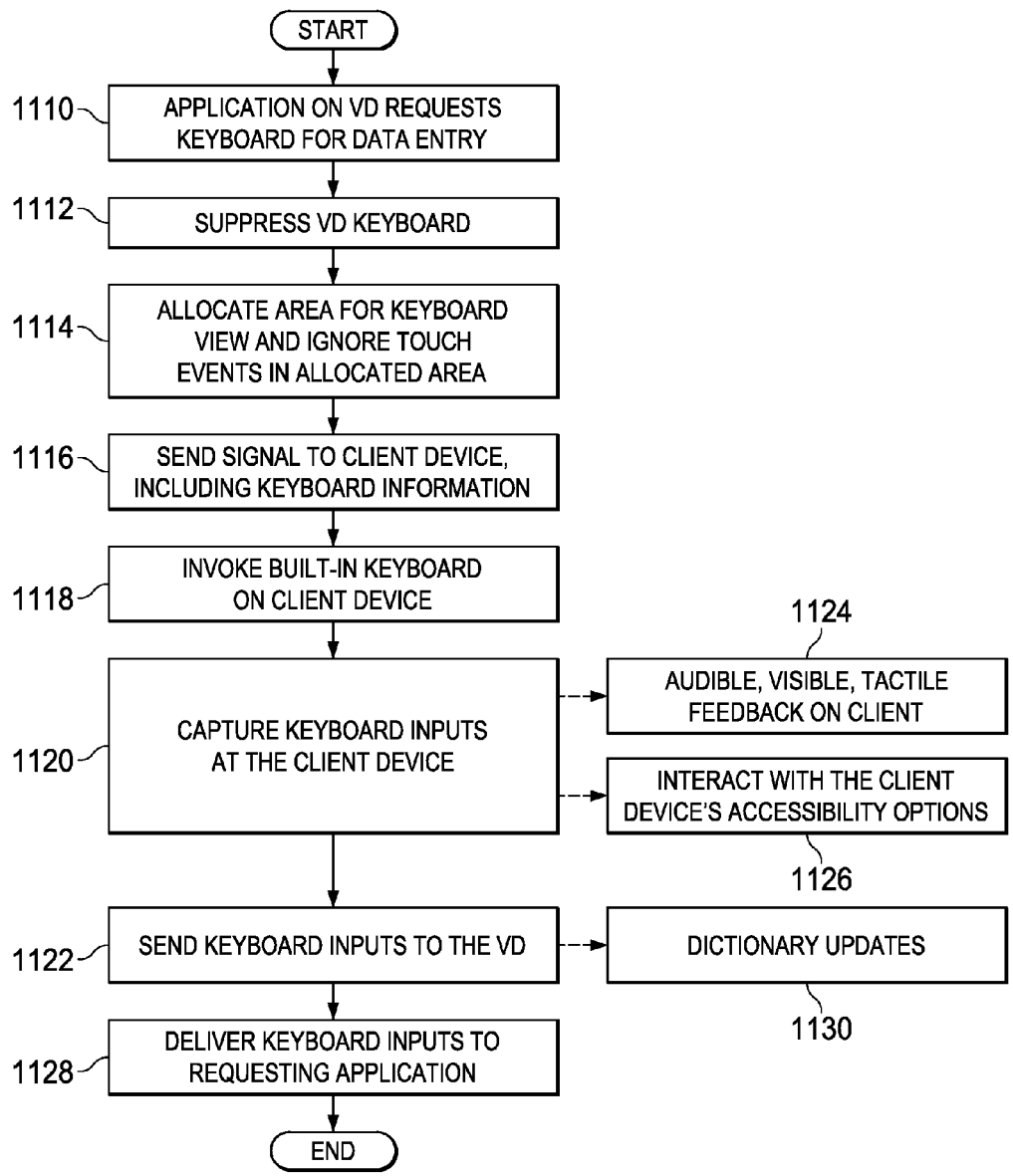
FIG. 11 depicts a flowchart of a process for a keyboard bypass mechanism, according to one embodiment.

FIG. 11 depicts a flowchart of a process for a virtual device keyboard bypass mechanism, according to one embodiment. The process begins at step 1110, where an application on the virtual device requests a keyboard for user data entry. At step 1112, the virtual device suppresses the virtual device soft keyboard from launching on the server. At step 1114, the system provisions the soft keyboard area for a keyboard view, and ignores touch events within this boundary. A signal is also sent to the client device (step 1116), including various keyboard parameters, such as the screen boundary, keyboard type, keyboard language, etc., that will be occupied by the client keyboard. At step 1118, the built-in keyboard on the client device is invoked, and the keyboard is displayed in place of the virtual device keyboard that would have been displayed. At step 1120, keyboard inputs are captured by the client device keyboard. The keyboard inputs are then sent to the virtual device (step 1122). Depending on the keyboard settings, the user may receive a combination of audible, visible, and/or tactile feedback at the client for each key pressed (step 1124). Based on information in the signal sent to the client device, the user may also receive appropriate feedback from the client device, as configured on the virtual device's accessibility settings (step 1126). At the virtual device, the received keyboard inputs are delivered to the application on the virtual device that initially requested keyboard input (step 1128). Any updates to the dictionary wordlist as entered by the user will also be sent to the virtual device to be appropriately updated (step 1130).

Another approach for addressing network latency relates to placing telephone calls. Voice over Internet Protocol (VoIP) technology for making calls over mobile networks (e.g., 4G) is often unreliable compared to conventional phone calls across the same network. VoIP is dependent on IP and therefore may suffer from packet delays and resends. Also, the network carrier is typically unable to prioritize the network traffic for VoIP, whereas the network carrier can leverage Quality of Service techniques to prioritize voice calls made through the regular phone mechanism of the local phone. Given this, users may sometimes prefer to make a phone call through the phone network rather than relying on a VoIP call made via a remote virtual device.

This approach focuses on allowing a user to select whether touching (or clicking, entering, etc.) a phone number in an application in the virtual device should invoke a phone call using VoIP using an application within the virtual device, or whether it should pass the phone number to the client application that then invokes the call on the local phone using the regular phone call network of the network carrier.

Figure 12:
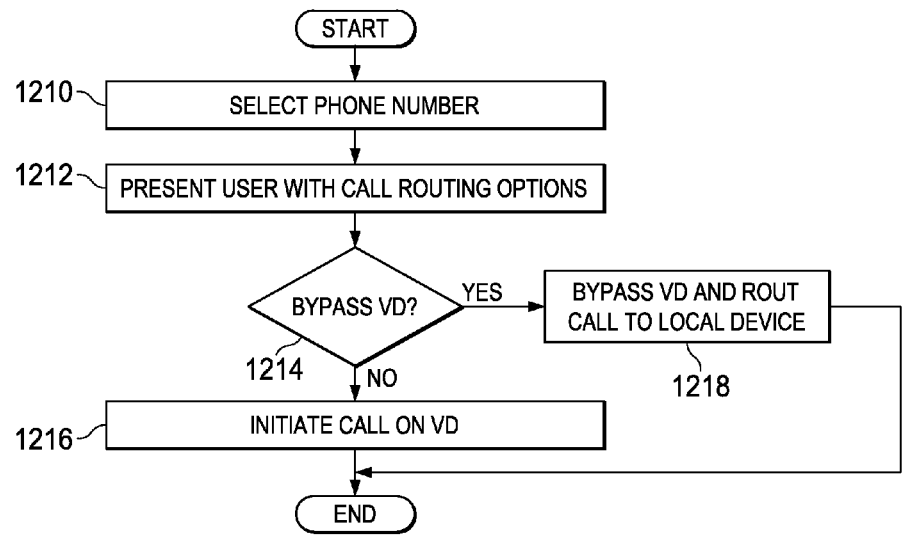
FIG. 12 depicts a flowchart of a process for a VoIP bypass mechanism, according to one embodiment.

FIG. 12 depicts a flowchart of a process for a virtual device VoIP bypass mechanism, according to one embodiment. The process begins at step 1210, where the system detects that a user has selected a phone number, either by touching or selecting a number on the screen, entering a number in the dialer, etc. In response, the user is presented with a user interface element (step 1212) that includes call routing options from the virtual device and call routing options bypassing the virtual device and placing the call from the local device (for example, a smartphone) in the user's hands. At step 1214, the user selects a call routing option. If the user chooses to place the call using the virtual device, the process proceeds to step 1216, where a call is initiated by the virtual device. If the user chooses to bypass the virtual device (step 1218), the phone call is placed from the physical phone across the network carrier's voice network. In some embodiments, the selection can be made automatically, based on user or administrator preferences, security policies, etc. In some embodiments, an administrator can enable, disable or force invocation of phone calls through the network carrier's network from the client device.

Another approach for addressing network latency relates to placing and improving SIP calls. SIP bypass/delegation is a technique to improve SIP calls via the virtual device. One issue with the existing SIP implementation in a virtual device is that latency due to the recording of sound, processing it, shipping it over multiple transports, decoding and re-encoding the audio, and then playing back the audio under similar network delays results in "choppy" conversations with a lot of noise and echo. Making a call usually results in the user's using walkie-talkie type speech to complete a conversation without talking over each other.

The main idea around SIP bypass is to use as much of the client for processing SIP calls as possible. Echo suppression or cancellation and other features are typically built into the client device and thus aren't subject to network delays if implemented in the client. Similarly, audio encoding and decoding is negotiated and performed on the client device instead of chosen by the SIP client application running in the virtual device.

For security and confidentiality, in some embodiments, a user's SIP profile information is not maintained in the client device. In this example, all user profile information and contacts reside in the virtual device. To accomplish this, the client application running on the client device and the virtual device work together to forward SIP calls using a delegated user account maintained in the virtual device. A special client only profile (the 'client delegate') is maintained in the client device that directs SIP communications through a port maintained by the client application on the client device. The virtual device captures these SIP messages, replaces any profile information provided in the client with the virtual device's SIP profile, and then forwards messages to a private SIP server running in the enterprise. The client device does not know anything about the user's SIP profile.

Figure 13:
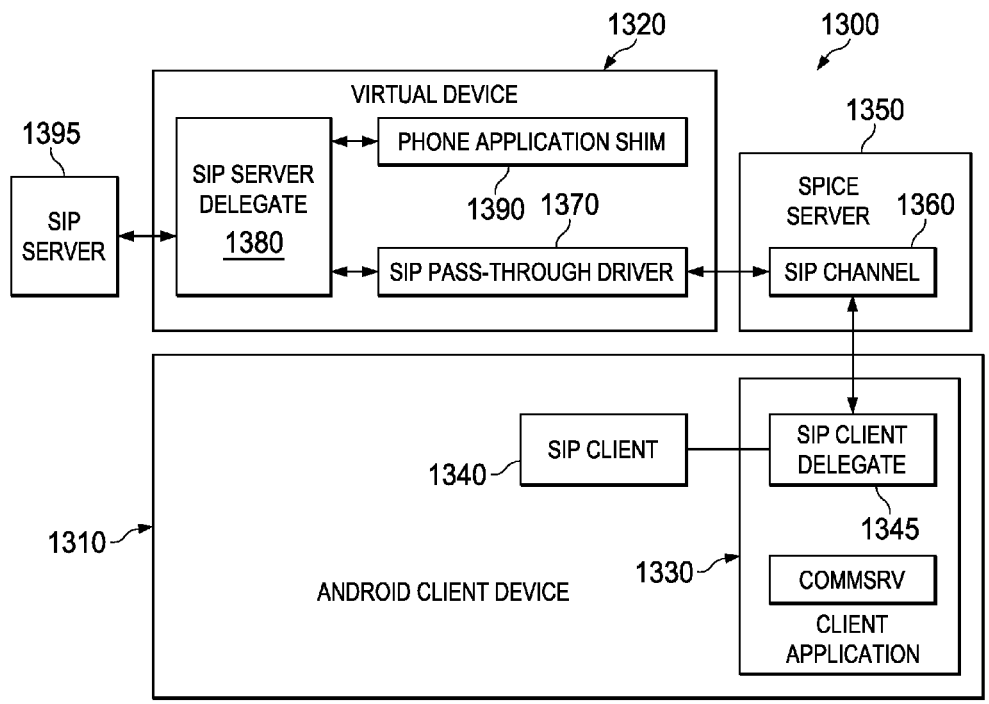
FIG. 13 depicts a diagrammatic representation of the system components used for SIP bypass and delegation.

FIG. 13 is a block diagram illustrating the system components used for SIP bypass and delegation in one embodiment. FIG. 13 shows a system architecture 1300, including a client device 1310 and a virtual device 1320. The client device 1310 uses a VC client application 1330 to communicate with the virtual device 1320, as discussed above. The client device 1310 has a SIP client 1340, which the client can use for any desired SIP functions. The client application 1330 communicates with the virtual device 1320 using SPICE server 1350, which includes a SIP channel 1360, used for SIP communications. When a user places a SIP call using the virtual device 1320, the Phone App 1390 in the virtual device 1320 initiates the call by sending a SIP call initiation message via the SIP pass-through driver 1370, to the SIP Channel 1360 which passes the data to the to the SIP Client 1340 via the Android client 1330. As mentioned, for security, the client device does not contain the user's SIP profile information. When the virtual device 1320 communicates with a private SIP server, such as SIP server 1395, the SIP server delegate 1380 replaces any profile information provided by the client 1310 with the SIP profile of the virtual device 1320. Also note that, voice recording and playback for SIP calls is accomplished using the microphone, speaker, noise cancellation circuitry, etc., of the client device 1310. The SIP bypass mechanism avoids unnecessary encoding and decoding steps, improving network latency and audio quality.

Figure 14:
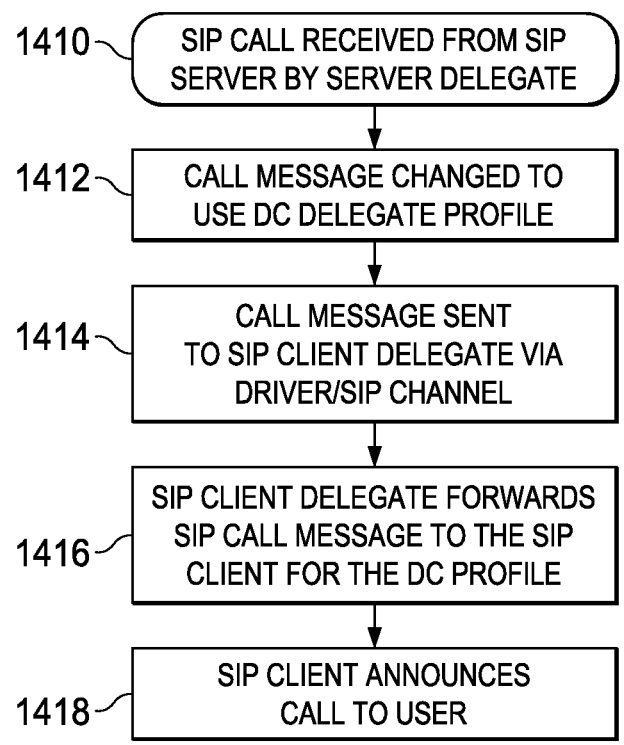
FIGS. 14 and 15 are flow charts depicting the flow control for a SIP call message and a SIP call initiation.
Figure 15:
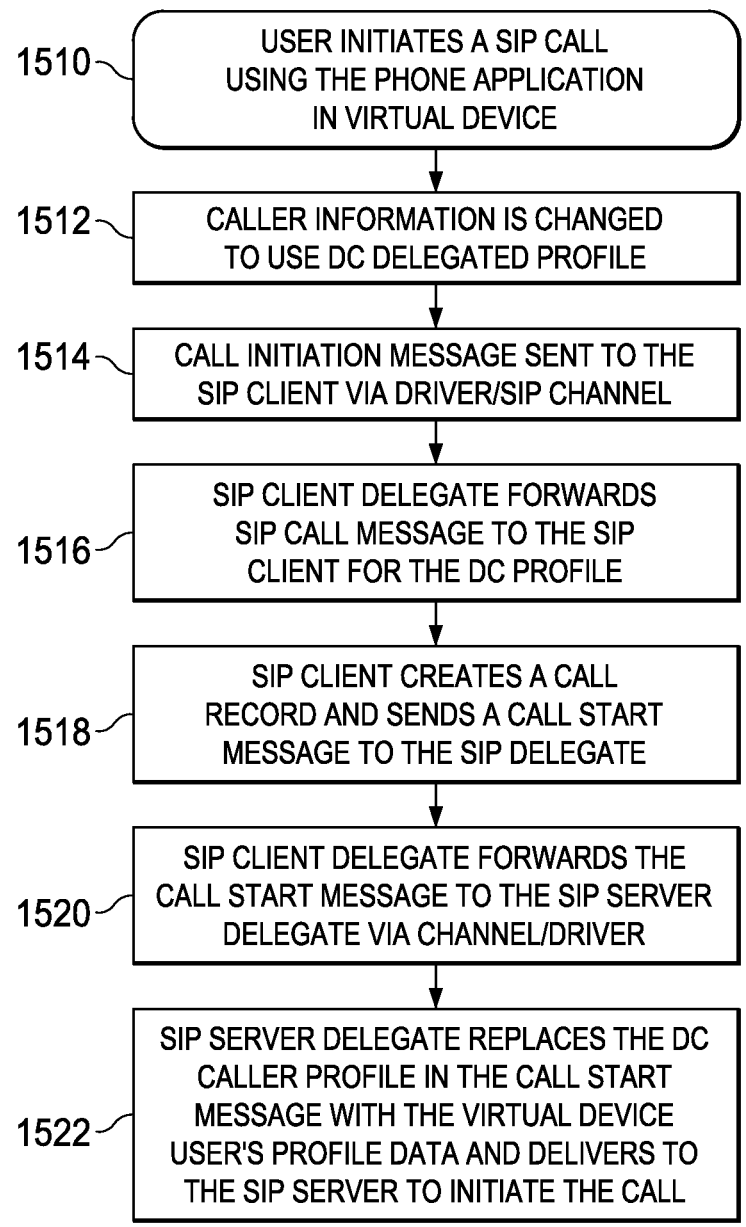

FIGS. 14 and 15 are flow charts depicting the flow control for a SIP call message and a SIP call initiation. Referring to FIG. 13 and FIG. 15, a user initiates a SIP call using the phone application 1390 in the virtual device 1320 (step 1510). At step 1512, the caller information is changed to use the delegate profile, and a call initiation message is sent to the SIP client 1340 via the SIP channel 1360 (step 1514). The SIP client delegate 1345 forwards the SIP call message to the SIP client 1340 for the delegate profile (step 1516). At step 1518, the SIP client 1340 creates a call record and sends a call start message to the SIP client delegate 1345. The SIP client delegate 1345 forwards the call start message to the SIP server delegate 1380 via the SIP channel 1360 and the SIP pass-through driver 1370 (step 1520). At step 1522, the SIP server delegate 1380 replaces the delegate caller profile in the call start message with the profile data of the user of the virtual device 1320, and delivers the start message to the SIP server 1395 to initiate the call.

Referring to FIG. 13 and FIG. 14, step 1410 shows a SIP call received from SIP server 1395 by the SIP server delegate 1380. At step 1412, the call message is changed to use the delegate profile. At step 1414, the call message is sent to the SIP client delegate 1345 via SIP channel 1360. The SIP client delegate 1345 forwards the SIP call message to the SIP client 1340 for the delegate profile (step 1416). Finally, at step 1418, the SIP client 1340 announces the call to the user.

Note that the SIP client 1340 in the client device 1310 only knows about the caller via a local profile present on the client device 1310. When messages are forwarded to the SIP server delegate 1380 running in the virtual device 1320, the message is unwrapped and any profile information (depends upon the message) provided by the client device 1310 is replaced by the virtual device's SIP profile for the user. The message is then prepared and sent to the actual SIP server 1395 that is brokering the phone call.

Similarly, when a call from the SIP server 1395 is received by the virtual device 1320, any contact or virtual device information is replaced by generic delegate profile information in the SIP server delegate 1380 and is provided to the client device's SIP client application 1340 via the SIP client delegate in the client application 1330. No information identifying the user or the caller in the virtual device 1320 is provided to the client device 1310.

Another approach for addressing network latency relates to placing and improving video teleconference (VTC) calls. In some cases, for instance, for a particular VTC client application, VTC calls may be made more efficient by bypassing some of the decoding and re-encoding steps in the virtual device. As described above with respect to SIP calls, one issue with VTC implementations in a virtual device is latency due to the recording of video (as well as sound), processing it, shipping it over multiple transports, decoding and re-encoding the video, and then playing back the video under similar network delays, which may result in poor quality or delayed video. In some cases, a VTC bypass may use as much of the client for processing VTC calls as possible. In some embodiments, video can be captured in the correct native format for VTC, rather than capturing video in another format and then changing it at the virtual device server. The captured video (in the native VTC format) can then be passed to the client device in the same or similar manner as with SIP data, as described above.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for reducing network latency in a virtual mobile device platform, the method comprising:
providing, by a virtual mobile device platform embodied on at least one server machine, a virtual mobile device specifically configured for a physical mobile device, the physical mobile device communicatively connected to the virtual mobile device platform over a network;
responsive to a request from the physical mobile device over the network, identifying an element or function of the virtual mobile device to be bypassed; and passing a response to the request to a framework executing on the physical mobile device to implement a bypass function of the virtual mobile device platform, thereby bypassing the identified element or function of the virtual mobile device when communicating with the physical mobile device over the network.

2. The method according to claim 1, further comprising:
the virtual mobile device routing content from a content source to the physical mobile device without decoding the content from the content source.

3. The method according to claim 1, further comprising:
establishing a network connection connecting the physical mobile device to a content source via the virtual mobile device; and
based at least in part on the network connection, determining whether to bypass or utilize the identified element or function of the virtual mobile device.

4. The method according to claim 3, further comprising:
the virtual mobile device determining a first network speed between the virtual mobile device and the physical mobile device and adjusting a second network speed between the virtual mobile device and the content source.

5. The method according to claim 1, further comprising:
providing a local application launcher on the physical mobile device for launching applications on the virtual mobile device.

6. The method according to claim 1, further comprising:
rendering user interface elements locally on the physical mobile device; and
executing, processes and application logic associated with the user interface elements on the virtual mobile device.

7. The method according to claim 1, wherein the identified element or function represents a virtual device soft keyboard, the method further comprising:
the virtual mobile device suppressing the virtual device soft keyboard from launching on the virtual mobile device platform server machine.

8. A computer program product comprising at least one non-transitory computer readable medium storing instructions translatable by a virtual mobile device platform server machine to perform:
providing a virtual mobile device specifically configured for a physical mobile device, the physical mobile device communicatively connected to the virtual mobile device platform over a network;
responsive to a request from the physical mobile device over the network, identifying an element or function of the virtual mobile device to be bypassed; and
passing a response to the request to a framework executing on the physical mobile device to implement a bypass function of the virtual mobile device platform, thereby bypassing the identified element or function of the virtual mobile device when communicating with the physical mobile device over the network.

9. The computer program product of claim 8, wherein the at least one non-transitory computer readable medium stores further instructions translatable by the virtual mobile device platform server machine to perform:
routing content from a content source to the physical mobile device without decoding the content from the content source.

10. The computer program product of claim 8, wherein the at least one non-transitory computer readable medium stores further instructions translatable by the virtual mobile device platform server machine to perform:
establishing a network connection connecting the physical mobile device to a content source via the virtual mobile device; and
based at least in part on the network connection, determining whether to bypass or utilize the identified element or function of the virtual mobile device.

11. The computer program product of claim 10, wherein the at least one non-transitory computer readable medium stores further instructions translatable by the virtual mobile device platform server machine to perform:
determining a first network speed between the virtual mobile device and the physical mobile device; and
adjusting a second network speed between the virtual mobile device and the content source.

12. The computer program product of claim 8, wherein the at least one non-transitory computer readable medium stores further instructions translatable by the virtual mobile device platform server machine to perform:
communicating with a local application launcher running on the physical mobile device; and
launching one or more applications on the virtual mobile device.

13. The computer program product of claim 8, wherein the at least one non-transitory computer readable medium stores further instructions translatable by the virtual mobile device platform server machine to perform:
executing processes and application logic associated with user interface elements rendered on the physical mobile device.

14. The computer program product of claim 8, wherein the identified element or function represents a virtual device soft keyboard and wherein the at least one non-transitory computer readable medium stores further instructions translatable by the virtual mobile device platform server machine to perform:
suppressing the virtual device soft keyboard from launching on the virtual mobile device platform server machine.

15. A system for reducing network latency in a virtual mobile device platform, the system comprising:
at least one processor;
at least one non-transitory computer readable medium storing instructions translatable by the at least one processor to perform:
providing a virtual mobile device specifically configured for a physical mobile device, the physical mobile device communicatively connected to a virtual mobile device platform embodied on at least one server machine over a network;
responsive to a request from the physical mobile device over the network, identifying an element or function of the virtual mobile device to be bypassed; and
passing a response to the request to a framework executing on the physical mobile device to implement a bypass function of the virtual mobile device platform, thereby bypassing the identified element or function of the virtual mobile device when communicating with the physical mobile device over the network.

16. The system of claim 15, wherein the at least one non-transitory computer readable medium stores further instructions translatable by the at least one processor to perform:
routing content from a content source to the physical mobile device without decoding the content from the content source.

17. The system of claim 15, wherein the at least one non-transitory computer readable medium stores further instructions translatable by the at least one processor to perform:
- establishing a network connection connecting the physical mobile device to a content source via the virtual mobile device; and
- based at least in part on the network connection, determining whether to bypass or utilize the identified element or function of the virtual mobile device.

18. The system of claim 17, wherein the at least one non-transitory computer readable medium stores further instructions translatable by the at least one processor to perform:
- determining a first network speed between the virtual mobile device and the physical mobile device; and
- adjusting a second network speed between the virtual mobile device and the content source.

19. The system of claim 15, wherein the at least one non-transitory computer readable medium stores further instructions translatable by the at least one processor to perform:
- communicating with a local application launcher running on the physical mobile device; and
- launching one or more applications on the virtual mobile device.

20. The system of claim 15, wherein the at least one non-transitory computer readable medium stores further instructions translatable by the at least one processor to perform:
- executing processes and application logic associated with user interface elements rendered on the physical mobile device.

21. The system of claim 15, wherein the identified element or function represents a virtual device soft keyboard and wherein the at least one non-transitory computer readable medium stores further instructions translatable by the at least one processor to perform:
- suppressing the virtual device soft keyboard from launching on the virtual mobile device platform.

\* \* \* \* \*